United States Patent
Nagai et al.

(10) Patent No.: US 7,636,360 B2
(45) Date of Patent: Dec. 22, 2009

(54) DYNAMIC VLAN ID ASSIGNMENT AND PACKET TRANSFER APPARATUS

(75) Inventors: Minoru Nagai, Fujisawa (JP); Hiroaki Miyata, Yokohama (JP); Migaku Ota, Yokohama (JP)

(73) Assignee: Hitachi Communications Technologies, Ltd., Tokyo (JP)

( * ) Notice: Subject to any disclaimer, the term of this patent is extended or adjusted under 35 U.S.C. 154(b) by 595 days.

(21) Appl. No.: 11/391,417

(22) Filed: Mar. 29, 2006

(65) Prior Publication Data
US 2006/0274744 A1   Dec. 7, 2006

(30) Foreign Application Priority Data
Jun. 7, 2005   (JP)  ............................. 2005-167263

(51) Int. Cl.
*H04L 12/28* (2006.01)
*H04L 12/56* (2006.01)
*G06F 15/16* (2006.01)

(52) U.S. Cl. .................. 370/395; 370/389; 370/401; 370/420

(58) Field of Classification Search ......... 370/235–299, 370/389–395, 401–420; 709/227–249
See application file for complete search history.

(56) References Cited

U.S. PATENT DOCUMENTS 6,094,437 A * 7/2000 Loehndorf et al. .......... 370/420
6,157,649 A * 12/2000 Peirce et al. ................ 370/401
6,463,475 B1 * 10/2002 Calhoun ..................... 709/227
6,970,459 B1 * 11/2005 Meier ......................... 370/389
6,996,110 B1 * 2/2006 Amara et al. ............... 370/396
7,020,084 B1 * 3/2006 Tanaka et al. ............... 370/235
7,299,301 B1 * 11/2007 Verma et al. ................ 709/249

FOREIGN PATENT DOCUMENTS

JP   11-215152   9/1999

OTHER PUBLICATIONS

IEEE Std802, 1Q-1998, Chapter 11, pp. 77-92.

* cited by examiner

*Primary Examiner*—Man Phan
(74) *Attorney, Agent, or Firm*—Brundidge & Stanger, P.C.

(57) ABSTRACT

Any or unique VLAN ID is dynamically assigned to a user terminal connected to a network, and communication by the assigned VLAN ID is enabled. A connection request from a user terminal is directed to L2GWs by a tagged VLAN frame having a common VLAN ID on the network. The L2GWs determine whether the connection request can be met, obtain a VLAN ID that can be assigned to the user terminal from a VLAN ID management server, configure themselves to communicate by the assigned VLAN ID, and report the VLAN ID to the user terminal. The user terminal performs subsequent communication by the reported VLAN ID. L2SWs monitor communication between the user terminal and the L2GWs and configure themselves to allow communication between the user terminal and the L2GWs by the VLAN ID assigned to the user terminal.

20 Claims, 39 Drawing Sheets

| 801815 | 801816 | 801817 | 801818 | 801819 |
|---|---|---|---|---|
| VLAN-ID | TERMINAL MAC ADDRESS | L2GW PHYSICAL PORT NUMBER | CONNECTION STATUS | TIMER STATUS |
| VLAN2 | 0x000000001001 | P21 | CONNECTING | STOP |
| 8018151 | 8018161 | 8018171 | 8018181 | 8018191 |

FIG.8-7

| 801820 | 801821 |
|---|---|
| PHYSICAL PORT NUMBER | VLAN-ID |
| P21 | DEFAULT ID, VLAN2 |
| P2x | DEFAULT ID |

| ServiceName |
|---|
| NONE |
| VOIP |
| VOD |

8018221 — NONE
8018222 — VOIP
8018223 — VOD

FIG.8-9

| 801825 | 801826 | 801827 |
|---|---|---|
| VLAN-ID | USAGE STATE | REGISTERED L2GW |
| 1 | DEFAULT ID | Reserve |
| 2 | OCCUPIED | 1 |
| 3 | NOT USED | NOT USED |
| ≀ | ≀ | ≀ |
| 4094 | NOT USED | NOT USED |

| VLAN-ID | L2GW MAC ADDRESS | ServiceName | CONNECTION STATUS | TIMER STATUS |
|---|---|---|---|---|
| VLAN1 | 0xffffffffffff | NONE | DISCONNECTED | STOP |

| VLAN-ID | L2GW MAC ADDRESS | ServiceName | CONNECTION STATUS | TIMER STATUS |
|---|---|---|---|---|
| VLAN1 | 0xffffffffffff | NONE | PADO WAIT | COUNTING |

| VLAN-ID | L2GW MAC ADDRESS | ServiceName | CONNECTION STATUS | TIMER STATUS |
|---|---|---|---|---|
| VLAN1 | 0x000000001032 | NONE | PADO WAIT | COUNTING |

| VLAN-ID | L2GW MAC ADDRESS | ServiceName | CONNECTION STATUS | TIMER STATUS |
|---|---|---|---|---|
| VLAN1 | 0x000000001032 | NONE | PADS WAIT | COUNTING |

| VLAN-ID | L2GW MAC ADDRESS | ServiceName | CONNECTION STATUS | TIMER STATUS |
|---|---|---|---|---|
| VLAN2 | 0x000000001032 | NONE | CONNECTING | STOP |

| VLAN-ID | L2GW MAC ADDRESS | ServiceName | CONNECTION STATUS | TIMER STATUS |
|---|---|---|---|---|
| VLAN1 | 0xffffffffffff | NONE | DISCONNECTED | STOP |

(901901, 901902, 901903, 901904, 901905 / 9019011, 9019021, 9019041)

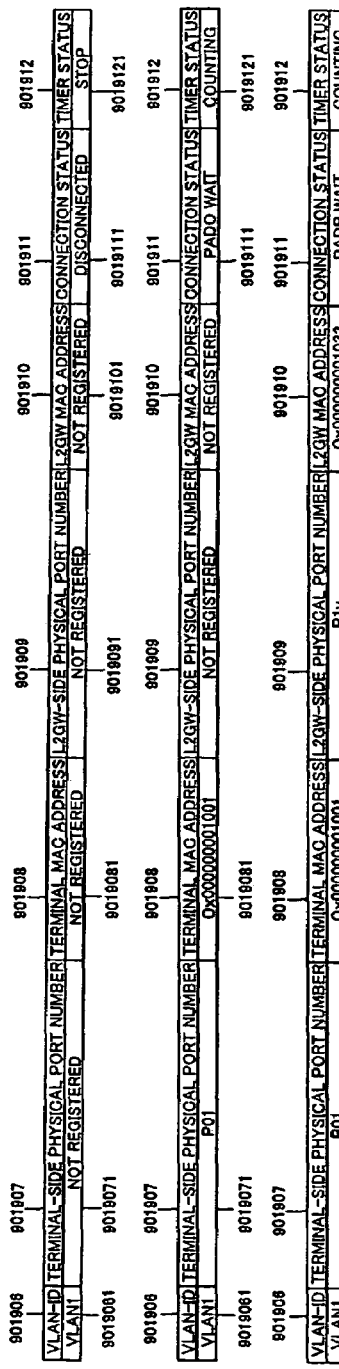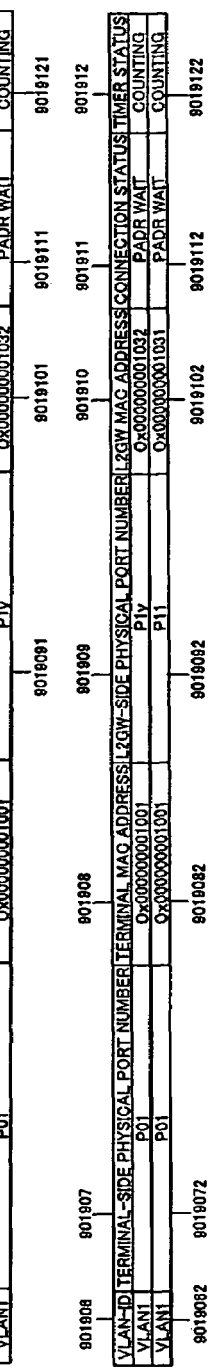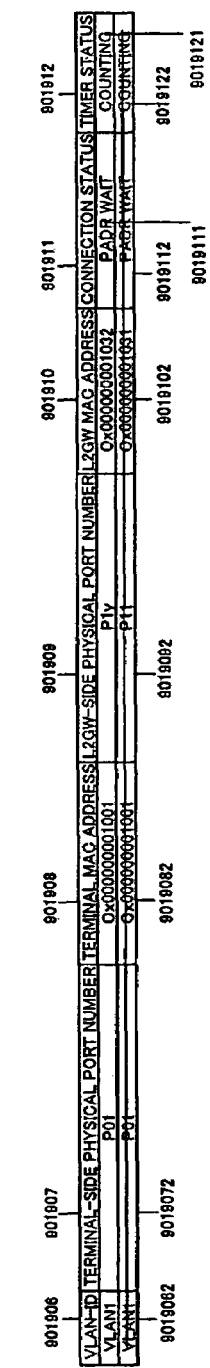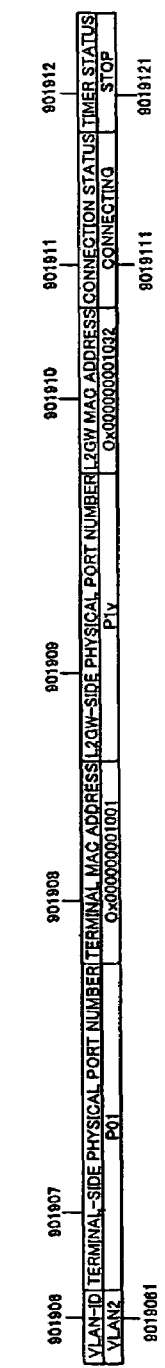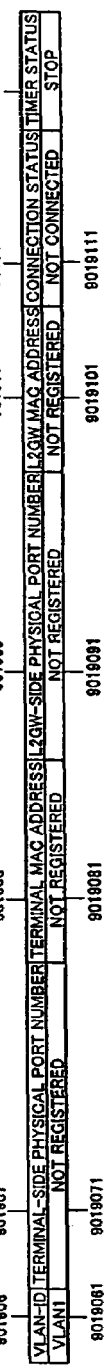

| | 901913 | 901914 | |
|---|---|---|---|
| | PHYSICAL PORT NUMBER | VLAN-ID | |
| 9019131 | P01 | VLAN1 | 9019141 |
| 9019132 | P02 | VLAN1 | 9019142 |
| 9019133 | P0n | VLAN1 | 9019143 |
| 9019134 | P11 | VLAN1 | 9019144 |
| 9019135 | P1y | VLAN1 | 9019145 |

FIG.9-14

| 901913 | 901914 | |
|---|---|---|
| PHYSICAL PORT NUMBER | VLAN-ID | |
| P01 | VLAN1, VLAN2 | 9019141 |
| P02 | VLAN1 | |
| P0n | VLAN1 | |
| P11 | VLAN1 | |
| P1y | VLAN1, VLAN2 | 9019145 |

FIG.9-15

| 901913 | 901914 | |
|---|---|---|
| PHYSICAL PORT NUMBER | VLAN-ID | |
| P01 | VLAN1 | 9019141 |
| P02 | VLAN1 | |
| P0n | VLAN1 | |
| P11 | VLAN1 | |
| P1y | VLAN1 | 9019145 |

| VLAN-ID | TERMINAL MAC ADDRESS | L2GW PHYSICAL PORT NUMBER | CONNECTION STATUS | TIMER STATUS |
|---|---|---|---|---|
| VLAN1 | NOT REGISTERED | | DISCONNECTED | STOP |

| VLAN-ID | TERMINAL MAC ADDRESS | L2GW PHYSICAL PORT NUMBER | CONNECTION STATUS | TIMER STATUS |
|---|---|---|---|---|
| VLAN1 | 0x000000001001 | P21 | PADR WAIT | COUNTING |

| VLAN-ID | TERMINAL MAC ADDRESS | L2GW PHYSICAL PORT NUMBER | CONNECTION STATUS | TIMER STATUS |
|---|---|---|---|---|
| VLAN2 | 0x000000001001 | P21 | CONNECTING | STOP |

| VLAN-ID | TERMINAL MAC ADDRESS | L2GW PHYSICAL PORT NUMBER | CONNECTION STATUS | TIMER STATUS |
|---|---|---|---|---|
| VLAN1 | NOT REGISTERED | | DISCONNECTED | STOP |

| PHYSICAL PORT NUMBER (901920) | VLAN-ID (901921) |
|---|---|
| P21 (9019201) | VLAN1 (9019211) |
| P2x (9019202) | VLAN1 (9019212) |

FIG.9-22

| PHYSICAL PORT NUMBER (901920) | VLAN-ID (901921) |
|---|---|
| P21 | VLAN1, VLAN2 (9019211) |
| P2x | VLAN1 |

FIG.9-23

| PHYSICAL PORT NUMBER (901920) | VLAN-ID (901921) |
|---|---|
| P21 | VLAN1 (9019211) |
| P2x | VLAN1 |

| VLAN-ID | USAGE STATE | REGISTERED L2GW |
|---|---|---|
| 1 | DEFAULT | Reserve |
| 2 | NOT USED | NOT USED |
| 3 | NOT USED | NOT USED |
| ≀ | ≀ | ≀ |
| 4094 | NOT USED | NOT USED |

FIG.9-24

| VLAN-ID | USAGE STATE | REGISTERED L2GW |
|---|---|---|
| 1 | DEFAULT | Reserve |
| 2 | OCCUPIED | 1 |
| 3 | NOT USED | NOT USED |
| ≀ | ≀ | ≀ |
| 4094 | NOT USED | NOT USED |

FIG.9-25

| VLAN-ID | USAGE STATE | REGISTERED L2GW |
|---|---|---|
| 1 | DEFAULT | Reserve |
| 2 | NOT USED | NOT USED |
| 3 | NOT USED | NOT USED |
| ≀ | ≀ | ≀ |
| 4094 | NOT USED | NOT USED |

FIG.9-26

|  | 1201823 | 1201824 |  |
|---|---|---|---|
|  | VLAN-ID | USAGE STATE |  |
| 12018231 — | 1 | DEFAULT ID | — 12018231 |
| 12018232 — | 2 | OCCUPIED | — 12018231 |
| 12018233 — | 3 | NOT USED | — 12018231 |
|  | ≀ | ≀ |  |
|  | 4094 | NOT USED |  |

FIG.12

| | 1501922 | 1501923 |
|---|---|---|
| | VLAN-ID | USAGE STATE |
| 15019221 | 1 | VLAN1 — 15019231 |
| 15019222 | 2 | NOT USED — 15019232 |
| 15019223 | 3 | NOT USED — 15019233 |
| | ≀ | ≀ |
| | 4094 | NOT USED |

FIG.15-1

| 1501922 | 1501923 |
|---|---|
| VLAN-ID | USAGE STATE |
| 1 | VLAN1 |
| 2 | OCCUPIED — 15019232 |
| 3 | NOT USED |
| ≀ | ≀ |
| 4094 | NOT USED |

FIG.15-2

| 1501922 | 1501923 |
|---|---|
| VLAN-ID | USAGE STATE |
| 1 | VLAN1 |
| 2 | NOT USED — 15019232 |
| 3 | NOT USED |
| ≀ | ≀ |
| 4094 | NOT USED |

FIG.15-3

DYNAMIC VLAN ID ASSIGNMENT AND PACKET TRANSFER APPARATUS

BACKGROUND OF THE INVENTION

1. Field of the Invention

The present invention relates to user terminals, Layer 2 switches (L2SWs), and Layer 2 gateways (L2GWs) to which VLAN IDs can be dynamically assigned in network systems that can be connected to an Ethernet (registered trademark) network.

2. Description of the Related Art

In recent years, corporate LANs and other networks have a virtual group of certain terminals built as a virtual LAN (VLAN), independently of the physical structures of the networks. This technology allows a network to be built, irrespective of a change in terminal location or a change in network configuration caused by an organizational change. The network management cost can be reduced, and the network load can be reduced due to a broadcast packet limitation.

One method of building a VLAN is to identify a VLAN by adding a VLAN tag to an Ethernet (registered trademark) frame header. This tag VLAN method allows a plurality of VLAN connections to be specified among apparatuses, giving flexibility to network configurations.

When a user terminal is connected to an existing VLAN, the connection information must be specified to each apparatus on the VLAN, such as a hub. The generic attribute registration protocol (GARP) VLAN registration protocol (GVRP) (non-patent document 1) enables a dynamic connection of a terminal to a VLAN when the terminal is connected. This protocol broadcasts a connection request from the terminal to the VLAN, and the apparatuses in the VLAN configure the VLAN setting sequentially according to the information.

A "Switching Hub with Default VLAN Configuration Function and VLAN Server" (patent document 1) has a function to connect a terminal which has not yet been registered to a system to a particular VLAN through a switching hub and to transfer the connection information to another switching hub.

Non-patent document 1: IEEE std802. 1Q-1998 (chapter 11, pp. 77-92)

Patent document 1: Japanese Unexamined Patent Application Publication No. Hei-11-215152

SUMMARY OF THE INVENTION

With the prior art, networks which provide a certain service, such as an access network, can accept a connection request to a VLAN network from particular user terminals or any number of unspecific user terminals after VLAN IDs are assigned to the user terminals, and work such as specifying MAC addresses and paths of the Layer 2 switches (L2SWs), routers, and other network apparatuses is also performed. Even when the GVRP can be used, advance VLAN ID assignment to user terminals is necessary, and an apparatus to which a user terminal is connected requires a configuration operation to enable communication by the VLAN ID assigned to the user terminal to be performed. The VLAN setting information is also required to be transferred to the other apparatuses. These configuration operations are carried out each time a user terminal is added, increasing the network load and maintenance cost. The VLAN ID assignment to user terminals requires the management of association between the user terminals and VLAN IDs, but the association information cannot be automatically specified in the individual user terminals. When a large number of user terminals are configured, a multiple specification of a VLAN ID and other errors can occur. The cost of the work including a configuration check will become enormous, and poor communication or a wrong connection, if any, will increase the network load.

The known example described above is implemented just by switching hubs, and it is difficult to apply this example to a large system such as an inter-site VLAN.

Accordingly, the present invention specifies a common VLAN ID of an entire network for connection from a user terminal to a VLAN and uses the common ID as a default VLAN ID in a VLAN ID assignment request. A user terminal configured to be able to execute connection processing on the default VLAN ID, a Layer 2 switch (L2SW) to serve the user terminal, and a Layer 2 gateway (L2GW) to serve the L2SW are provided. The L2GW or a management server provided on the network includes a management table for managing VLAN IDs that can be assigned. The L2GW includes a decision table indicating whether a service requested by the user terminal can be connected. The L2GW has a function to report an assigned VLAN ID to the user terminal and enables communication by the assigned VLAN ID. The L2SW can be configured to communicate by the VLAN ID to be reported, and the user terminal can be configured to communicate by the reported VLAN ID.

The VLAN ID is given in response to a VLAN ID assignment request from a user terminal, on the default VLAN by a connection sequence of the Point-to-Point Protocol over Ethernet (PPPoE, registered trademark) protocol. The PPPoE connection sequence exchanges the following packets between the user terminal and the L2GW through the L2SW in a PPPoE discover session, or a series of protocol processing for establishing a connection session: PPPoE Active Discovery Initiation (PADI) packet, PPPoE Active Discovery Offer (PADO) packet, PPPoE Active Discovery Request (PADR) packet, and PPPoE Active Discovery Session-conformation (PADS) packet. The L2GW has a function to judge whether a connection can be made by the Service Name and can select the service requested by the user terminal or assign it to another L2GW. Of course, an authentication system outside the L2GW can judge whether a service can be connected. When a connection request to a user terminal can be accepted, the L2GW assigns a VLAN ID to the user terminal in accordance with the VLAN ID management table on the network or in the apparatus. A VLAN ID other than the default VLAN ID can be assigned by any rule: A unique ID is assigned or any ID is assigned within a certain range in accordance with the terminal MAC address, Service Name, user ID, and other information; or an unused ID is assigned at random. The L2GW is configured to communicate by the VLAN ID assigned to the physical port used by the connection request, and the assigned VLAN ID is reported to the user terminal as a session ID distributed to the user terminal by a PPPoE connection sequence. The L2SW monitors the PPPoE connection sequence, extracts a VLAN ID from the session ID when the reception of a PADS packet is found, enables communication by the VLAN ID assigned to the physical port used by the PPPoE connection sequence, and transfers the PADS packet to the user terminal. The user terminal extracts a session ID from the received PADS packet and regards this ID as a VLAN ID. The subsequent communication is performed on the VLAN having the assigned VLAN ID. When an IP connection is made, for instance, an IP address and the like can be distributed through the use of DHCP, Radius, or another authentication system. A disconnection can be made by sending a PPPoE Active Discovery Terminate (PADT)

packet from the user terminal or L2GW and canceling all the settings related to the assigned VLAN ID of the user terminal, L2SW, and L2GW.

If the network allows the transfer of an untagged frame, when a PPPoE connection request is made by an untagged frame, without using the default VLAN, the L2GW determines whether the connection can be made in accordance with the terminal MAC address, Service Name, and other user information, and sends a VLAN ID, instead of the session ID, to the user terminal, and the user terminal performs communication by a tagged VLAN frame with the assigned VLAN ID, in the same way as for a normal PPPoE connection request.

According to the present invention, a VLAN ID can be automatically assigned to each user terminal at random or uniquely just by specifying a common VLAN ID in the network to a user terminal that can be connected to the network, eliminating the need for specifying a VLAN ID to each user terminal. The VLAN configuration of each apparatus in the network is also automatically performed, and the network management including the VLAN ID management is facilitated. Because broadcast from the user terminal is allowed only on the common VLAN, the network load can be reduced. When a PPPoE connection request is made by an untagged frame, VLAN ID can be distributed by permitting untagged frame transfer on the network, and the subsequent communication is performed on the VLAN, making it possible to reduce the network load. The VLAN ID can be embedded in the session ID of the PPPoE protocol, and the distinction of service and the selection of L2GW can be made in accordance with the Service Name tag. These functions can be implemented without changing the PPPoE protocol. The user terminal, L2SW, and L2GW do not require any modification, except for modifications to software including the addition of a management table. Accordingly, the present invention can be implemented at a low cost.

BRIEF DESCRIPTION OF THE DRAWINGS

FIGS. 2-1 to 2-3 are block diagrams showing the configurations of a terminal 101, an L2SW 102, and an L2GW 103 according to the first embodiment.

FIGS. 3-1 and 3-2 are views showing the configuration of a VLAN frame 106 according to the first embodiment.

FIGS. 4-1 and 4-2 are system sequence diagrams according to the first embodiment.

FIGS. 5-1 to 5-5 are flow charts showing the operation of the terminal 101 according to the first embodiment.

FIGS. 6-1 to 6-6 are flow charts showing the operation of the L2SW 102 according to the first embodiment.

FIGS. 7-1 to 7-4 are flow charts showing the operation of the L3GW 103 according to the first embodiment. FIGS. 8-1 to 8-10 show management tables according to the first embodiment.

FIGS. 9-1 to 9-26 show state changes in the management tables according to the first embodiment.

FIG. 10 shows a network configuration according to a second embodiment of the present invention.

FIG. 11 is a block diagram showing the configuration of an L2GW 103 according to the second embodiment.

FIG. 12 shows a management table according to the second embodiment.

FIGS. 13-1 and 13-2 are system sequence diagrams according to the second embodiment.

FIGS. 14-1 to 14-3 are flow charts showing the operation of the L2GW 103 according to the second embodiment.

FIGS. 15-1 to 15-3 show state changes in the management table according to the second embodiment.

DESCRIPTION OF THE PREFERRED EMBODIMENTS

A. First Embodiment

A first embodiment of the present invention will be described below with reference to the drawings. In the following description of the first embodiment, a default VLAN ID is specified. The same processing is performed for an untagged VLAN frame containing a PPPoE connection request, which will be described later.

1. System Configuration

Figure 1:
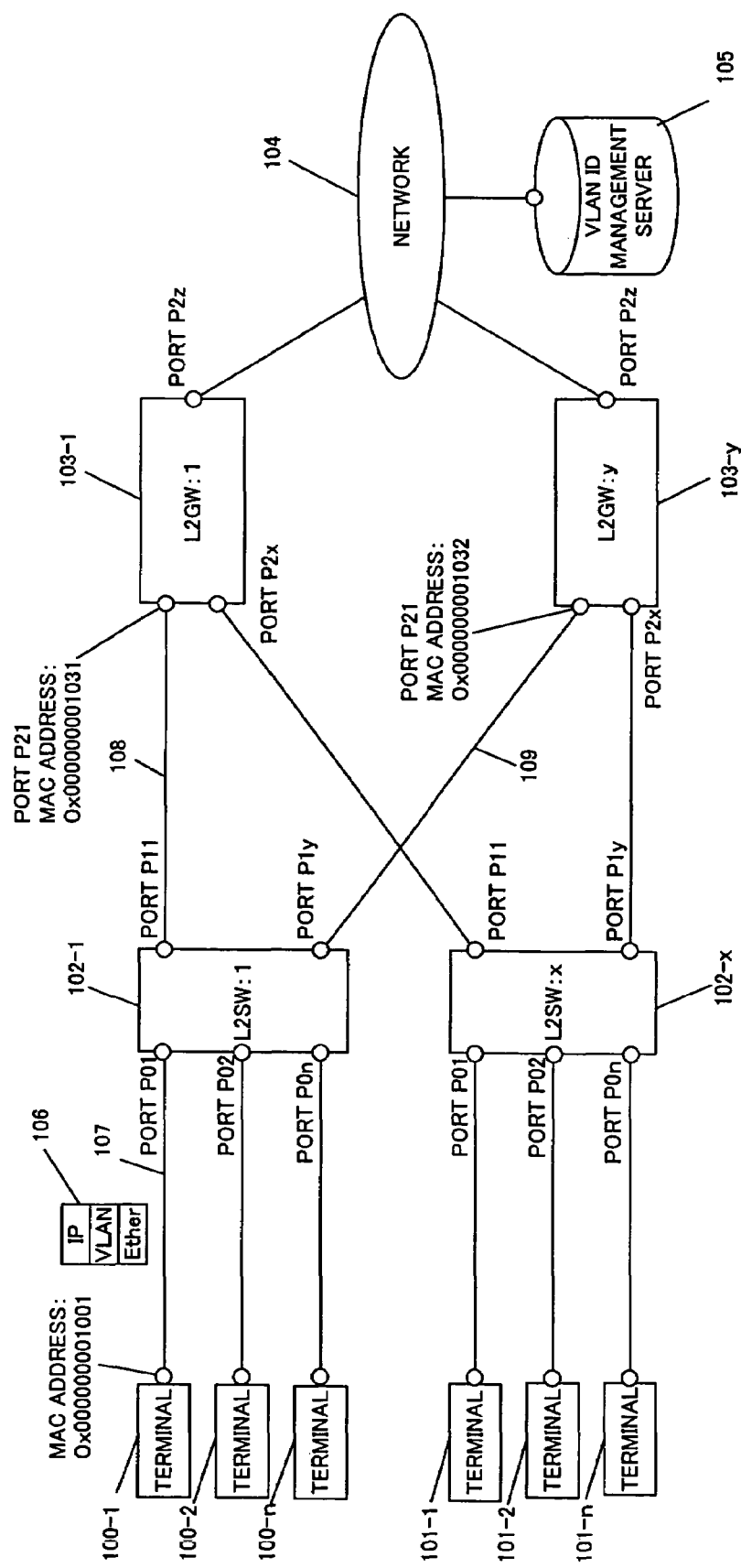
FIG. 1 shows a network configuration according to a first embodiment of the present invention.

FIG. 1 shows a network configuration of the first embodiment. The network shown in FIG. 1 includes user terminal units 100-1 to 100-n and 101-1 to 101-n, L2SWs 102-1 to 102-x which serve the terminal units, L2GWs 103-1 to 103-y which serve the L2SWs, a host network 104 connected to the L2GWs, and a VLAN ID management server 105 connected to the network. Communication from the terminal units 100-1 to 100-n and 101-1 to 101-n to the host network 104 is performed by a tagged VLAN frame 106. An IP packet and other data are transferred in the tagged VLAN frame.

Figures 1, 2:
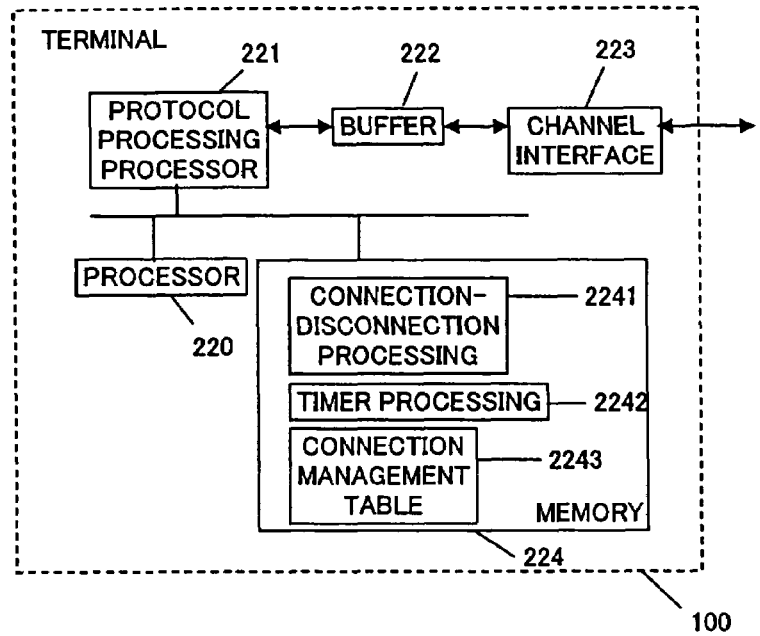
Figure 2:
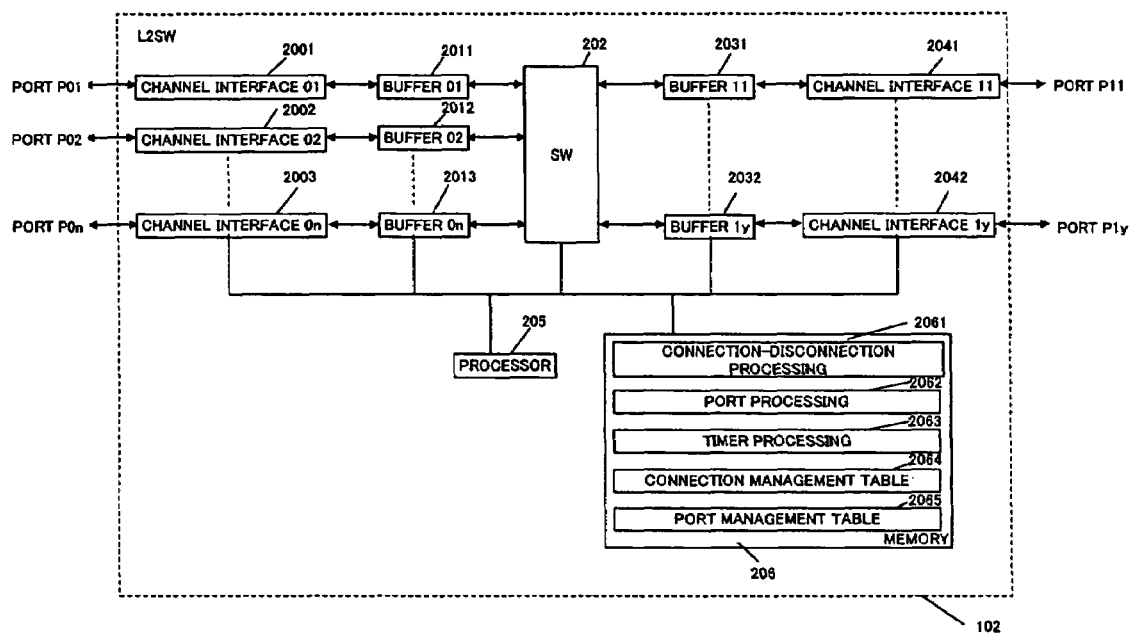

FIG. 2-1 shows the configuration of the terminal units 100-1 to 100-n and 101-1 to 101-n. The terminal units 101-1 to 100-n and 101-1 to 101-n include a processor 202 for controlling a terminal and performing a variety of processing, a memory 224 for storing processing and statuses of the terminal, a protocol processing processor 221 for managing protocol processing and other processing, a buffer 222 for buffering a frame processed by the protocol processing processor 221, and a channel interface 223 for performing transmission and reception of frame information. The processor 220 handles a communication request from a user in accordance with connection-disconnection processing 2241, timer processing 2242, and a connection management table 2243 on the memory 224, gives an instruction to the protocol processing processor 221, and monitors the status of the protocol processing processor 221. The protocol processing processor 221 monitors the status of the buffer 222, handles a frame received by the channel interface 223, and reports the status to the processor 220. The processor 220 or the protocol processing processor 221 performs processing as illustrated in flow charts and sequence diagrams below.

FIG. 2-2 shows the configuration of the L2SWs 102-1 to 102-x. The L2SWs 102-1 to 102-x include a plurality of input-output channel interfaces 2001 to 2003, 2041, and 2042, buffers 2011 to 2013, 2031, and 2032 for buffering frame information sent and received by the channel interfaces 2001 to 2003, 2041, and 2042, a switch (SW) 202 for exchanging or transferring frames between the channel interfaces 2001 to 2003, 2041, and 2042, a processor 205 for controlling the components mentioned above, and a memory 206 for holding the status of the L2SW. The processor 205 monitors the statuses of the channel interfaces 2001 to 2003, 2041, and 2042 and the buffers 2011 to 2013, 2031, and 2032, and sets the status of the SW 202 for the frame arriving at the channel interfaces 2001 to 2003, 2041, and 2042, in accordance with connection-disconnection processing 2061, port processing 2062, timer processing 2063, a connection management table 2064, and a port management table 2065 on the memory 206. The processor 205 performs processing as illustrated in flow charts and sequence diagrams below.

Figures 2, 3:
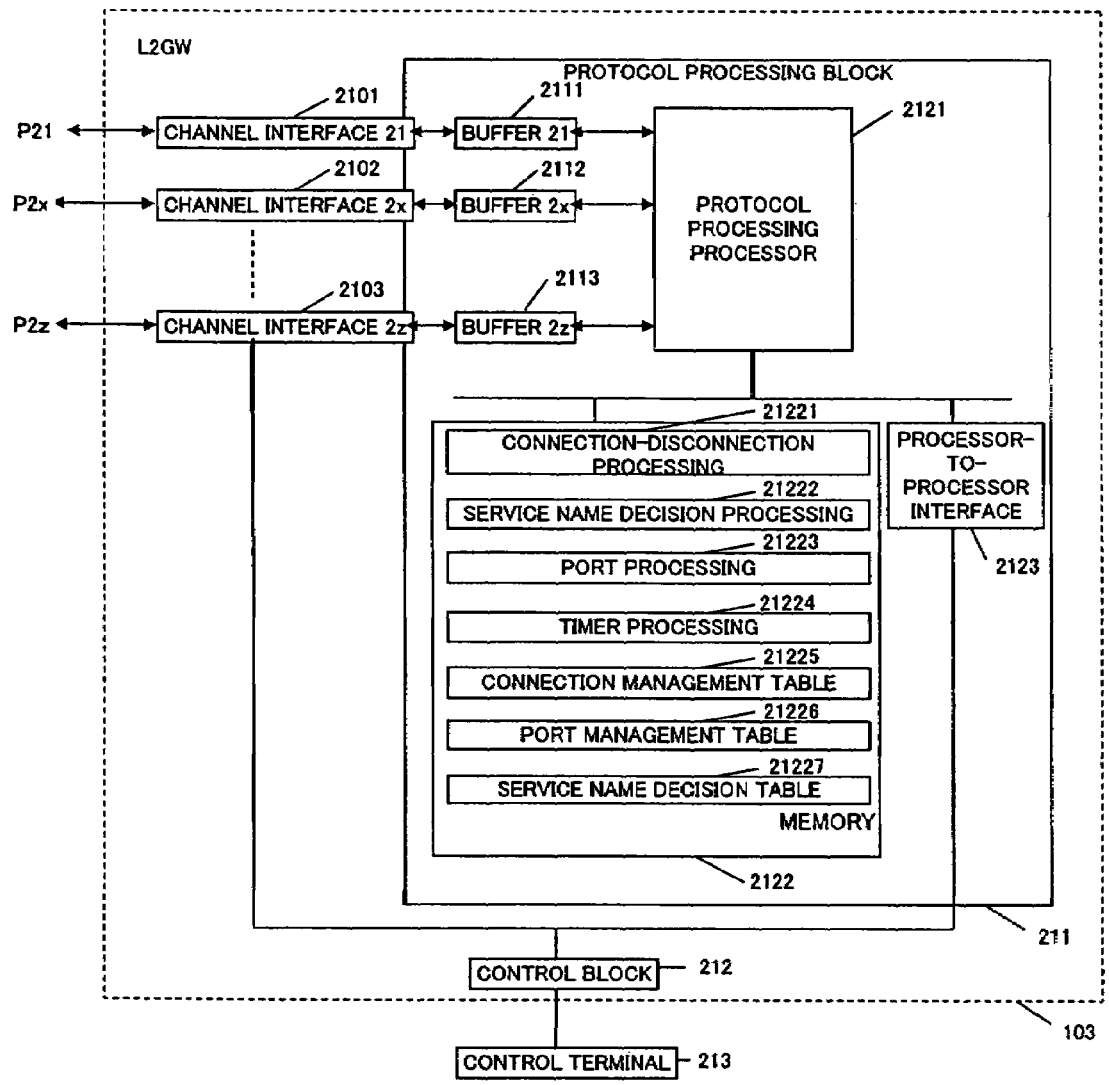
Figures 1, 3:
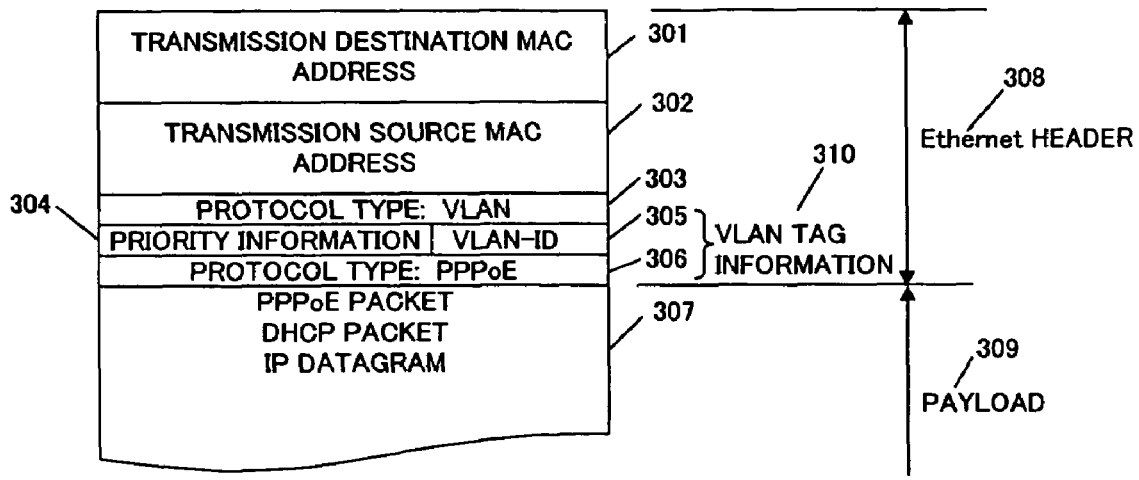
Figures 2, 3:
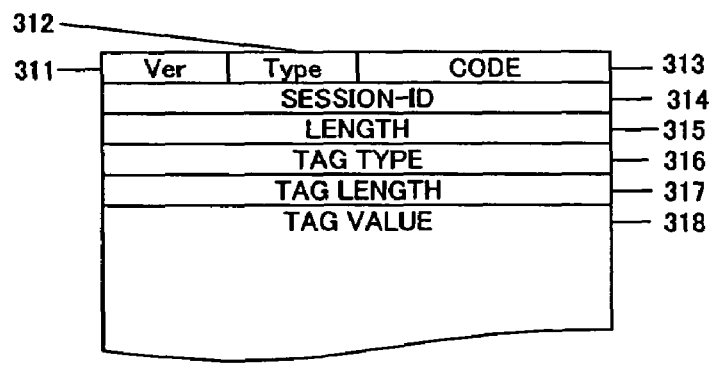

FIG. 2-3 shows the configuration of the L2GWs 103-1 to 103-y. The L2GWs 103-1 to 103-y include a plurality of input-output channel interfaces 2101 and 2102, a channel interface 2103 connected to the host network 104, a protocol processing block 211, and a control block 212 for controlling the protocol processing block 211. The control block 212 monitors the status of the protocol processing block 211, reports the status to a control terminal 213, specifies control parameters of the protocol processing block 211 in accordance with an instruction from the control terminal 213, and transfers a frame received from the protocol processing block 211 to channel interfaces 2101 to 2103 having an output port.

The protocol processing block 211 includes buffers 2111 to 2113 for buffering frames processed by the channel interfaces 2101 to 2103, a protocol processing processor 2121 for executing protocol processing, and a processor-to-processor interface 2123 for communicating with the control block 212. The protocol processing block 211 controls the L2GW 103-1 or 103-y as instructed by the control block 212, in accordance with connection-disconnection processing 21221, Service Name decision processing 21222, port processing 21223, timer processing 21224, a terminal management table 21225, a port management table 21226, and a Service Name decision table 21227 on the memory 2122. The protocol processing block 211 performs processing as illustrated in flow charts and sequence diagrams below.

FIG. 3-1 shows a VLAN frame format used in the present embodiment. The VLAN frame includes an Ethernet (registered trademark) header 308 and a payload 309. The Ethernet (registered trademark) header 308 includes a transmission destination MAC address 301, a transmission source MAC address 302, a first protocol type VLAN 303, a priority level 304, a VLAN ID 305, and a second protocol type PPPoE 306 (PADI, PADO, or the like). The priority level 304, the VLAN ID 305, and the second protocol type PPPoE 306 are referred to as VLAN tag information 310.

FIG. 3-2 shows the format of a PPPoE packet 307 contained in the payload 309 of the VLAN frame shown in FIG. 3-1. The PPPoE packet 307 includes a version (Ver) 311, a type 312, a code 313, a session ID 314, a length 315, a tag type 316, a tag length 317, and a tag value 318. When a Service Name is specified, for instance, the tag type 316 is set to "0X0101", and the Service Name is specified in the tag value field 318.

Figures 1, 8:
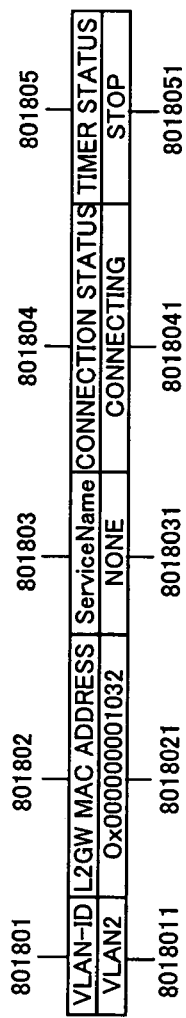
Figures 2, 8:
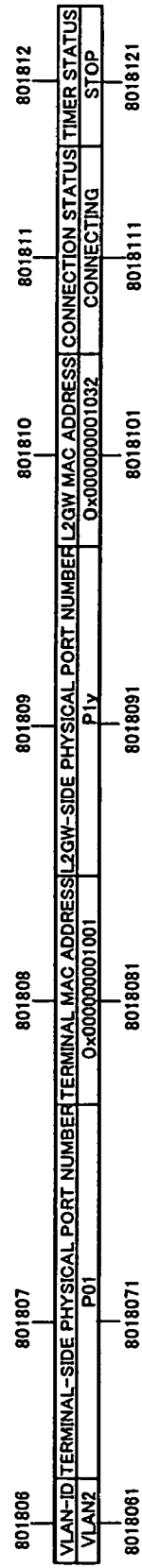
Figures 3, 8:
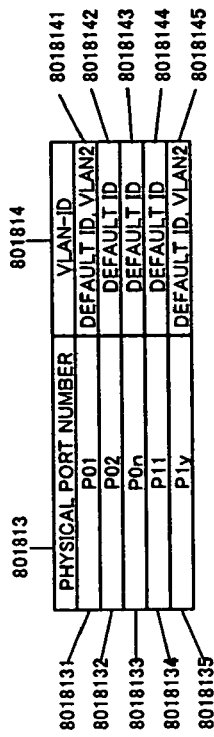
Figures 4, 8:
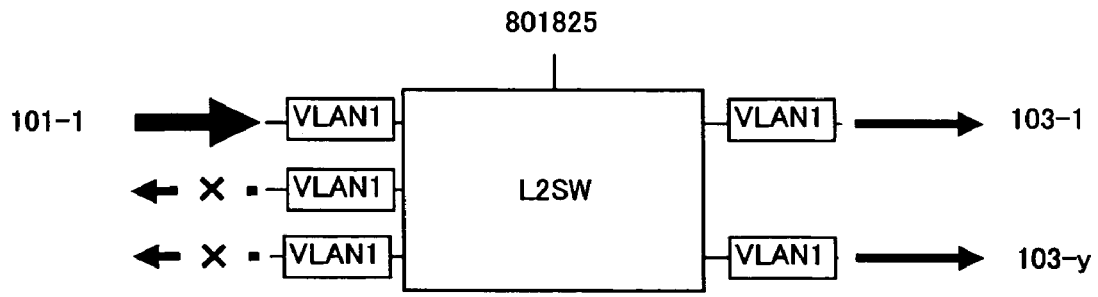
Figures 5, 8:
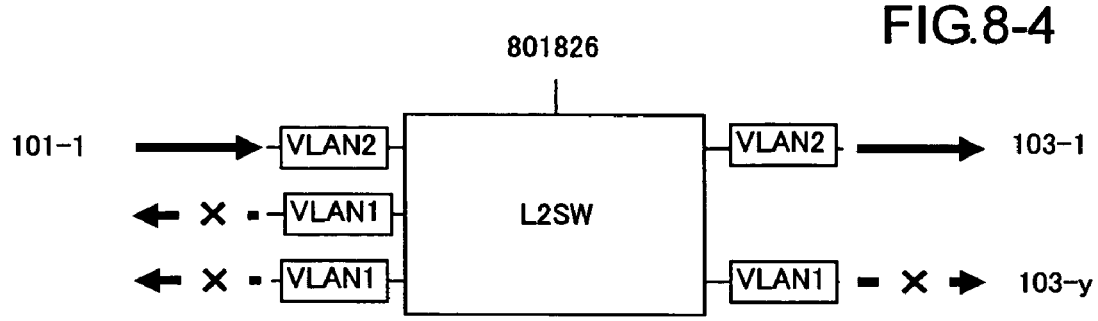
Figures 6, 8:
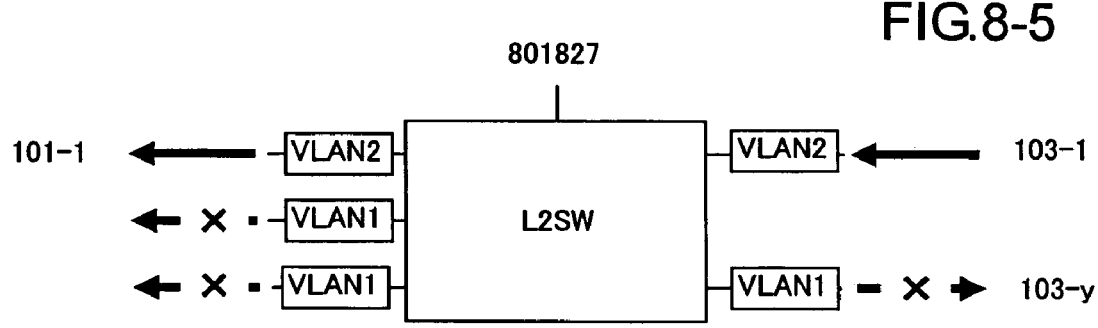

FIG. 8-1 shows the connection management table 2243 of the terminal units 100-1 to 100-n and 101-1 to 101-n. The management table includes a VLAN ID 801801 being connected, the MAC address 801802 of the L2GW 103-1 to 103-y being connected, a Service Name 801803 being connected, a connection status 801804, and a timer status 801805. Sample settings are shown in the table.

FIG. 8-2 shows the connection management table 2064 of the L2SWs 102-1 and 102-x. The connection management table includes a VLAN ID 801806, a terminal-side physical port number 801807, a terminal MAC address 801808, an L2GW-side physical port number 801809, an L2GW MAC address (801810), a connection status 801811, and a timer status 801812. FIG. 8-3 shows the port management table 2065 of the L2SWs. The port management table includes a physical port number 801813 and a VLAN ID 801814. The figure shows sample settings.

Figures 1, 7:
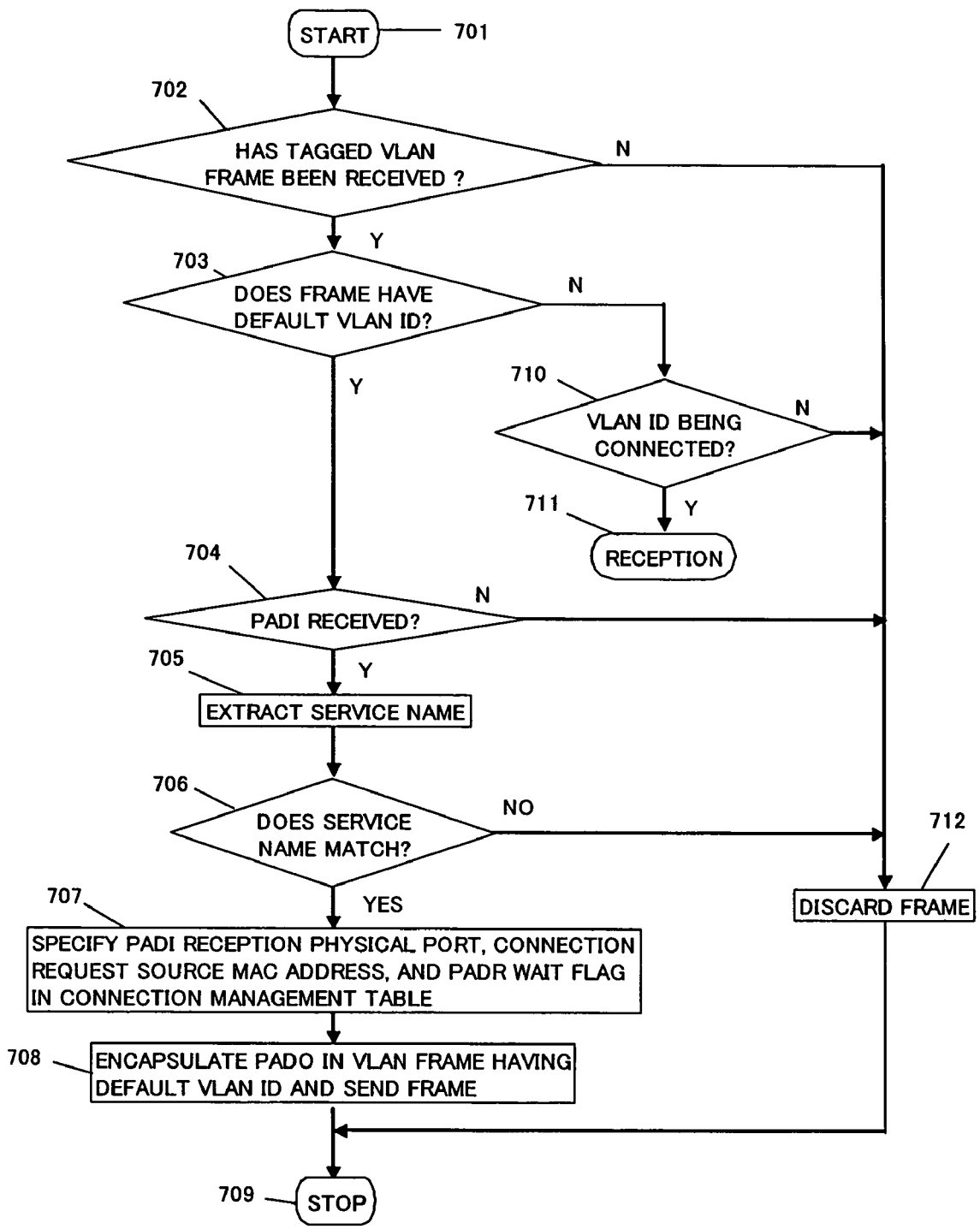
Figures 2, 7:
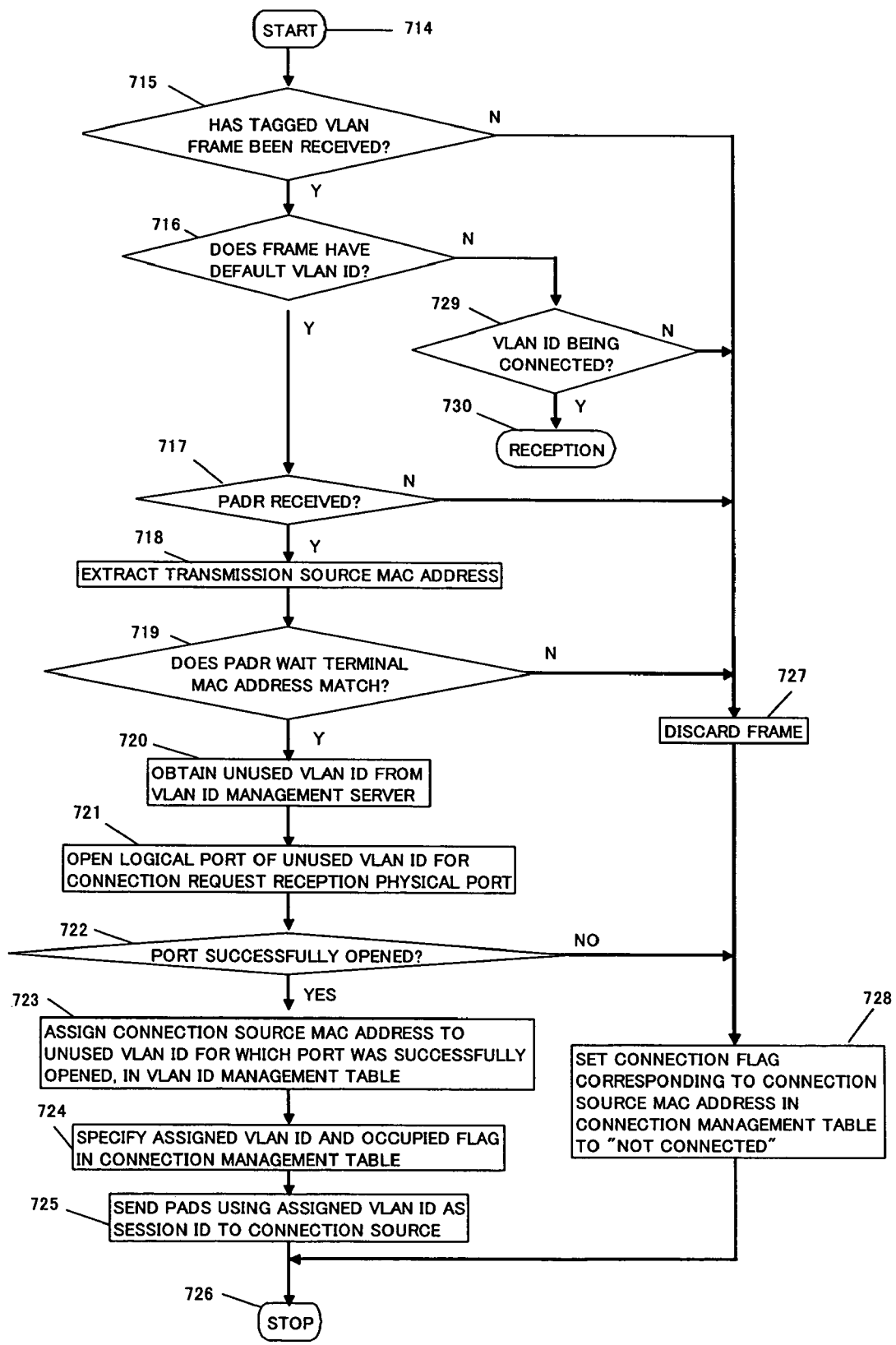
Figures 3, 7:
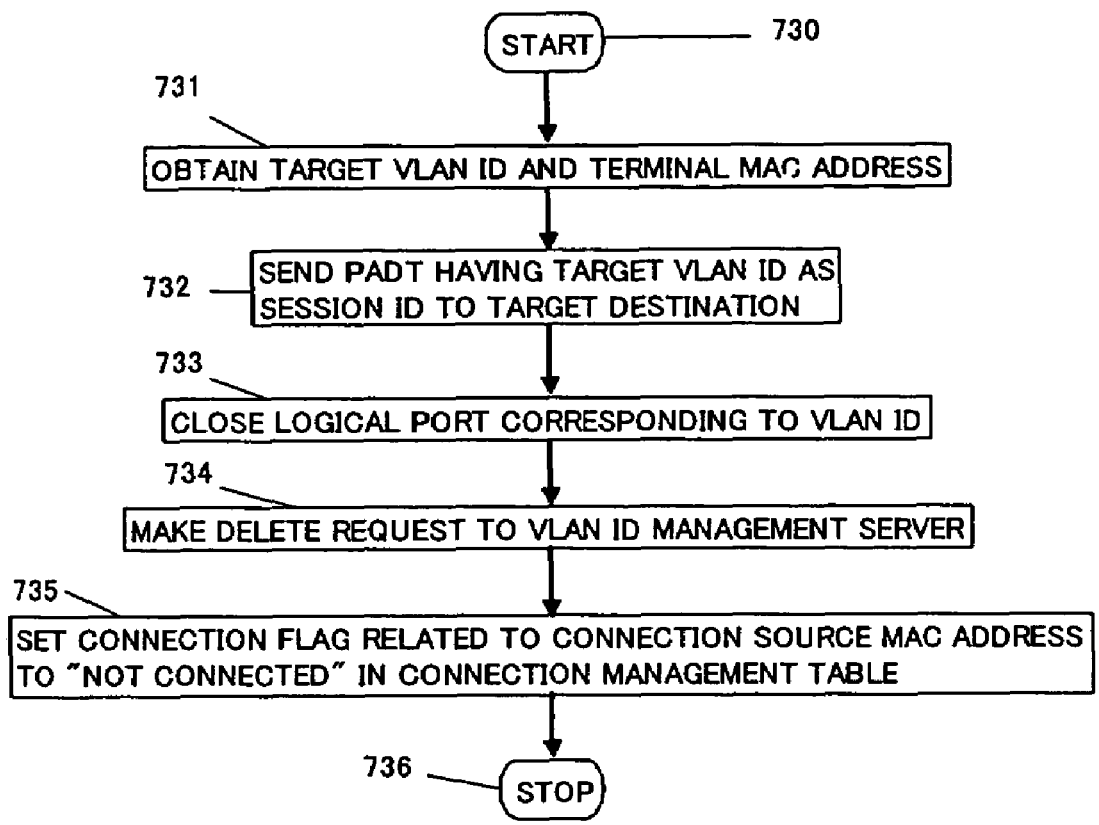
Figures 4, 7:
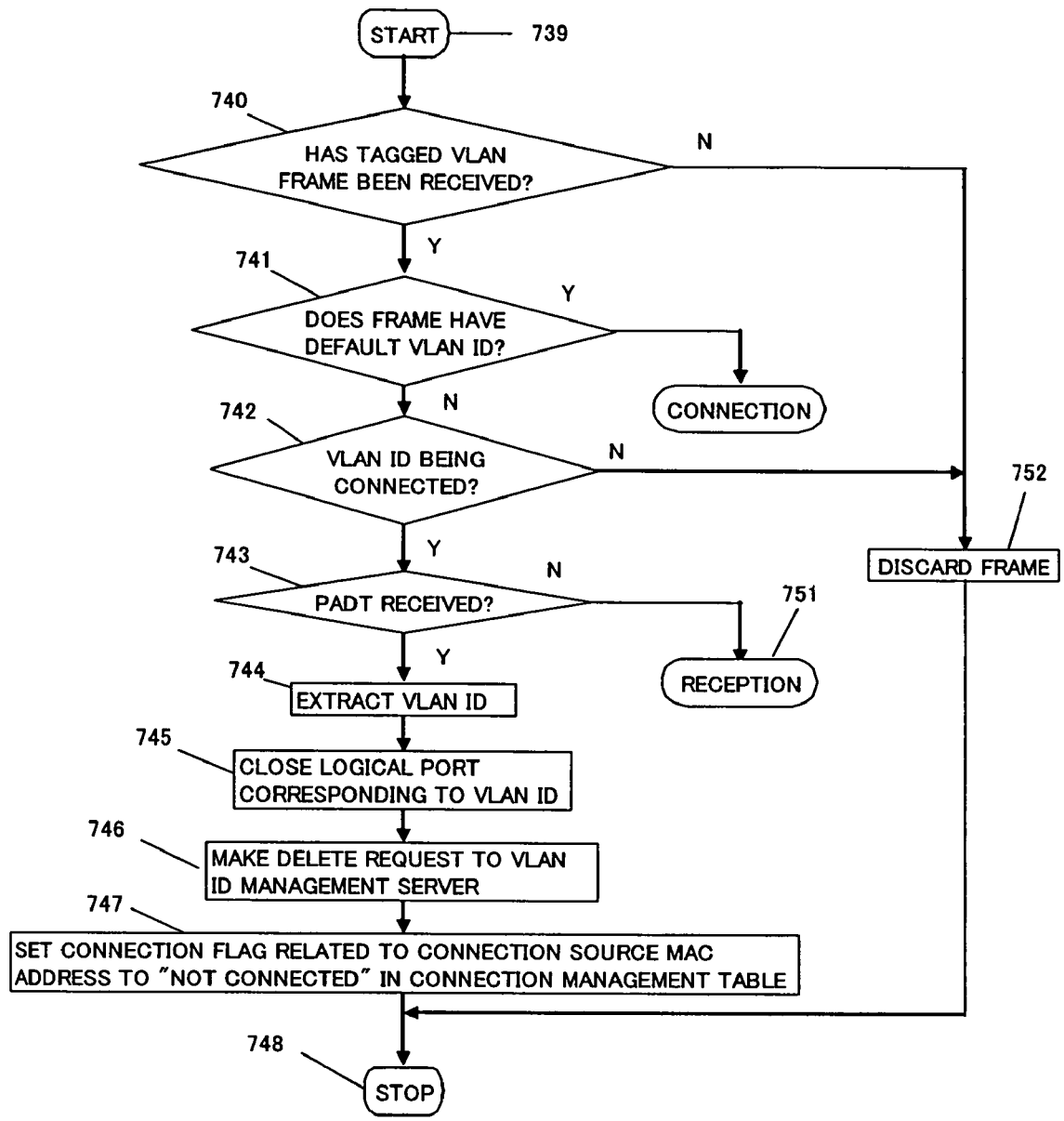

FIG. 8-7 shows the connection management table 21225 of the L2GWs 103-1 and 103-y. The connection management table includes a VLAN ID 801815, a terminal MAC address 801816, an L2GW physical port number 801817, a connection status 801818, and a timer status 801819. FIG. 8-8 shows the port management table 21226 of the L2GWs. The management table includes a physical port number 801820 and a VLAN ID 801821. FIG. 8-9 shows the Service Name decision table 21227 of the L2GW. The decision table includes a Service Name 801822. The figures show sample settings.

Figure 10:
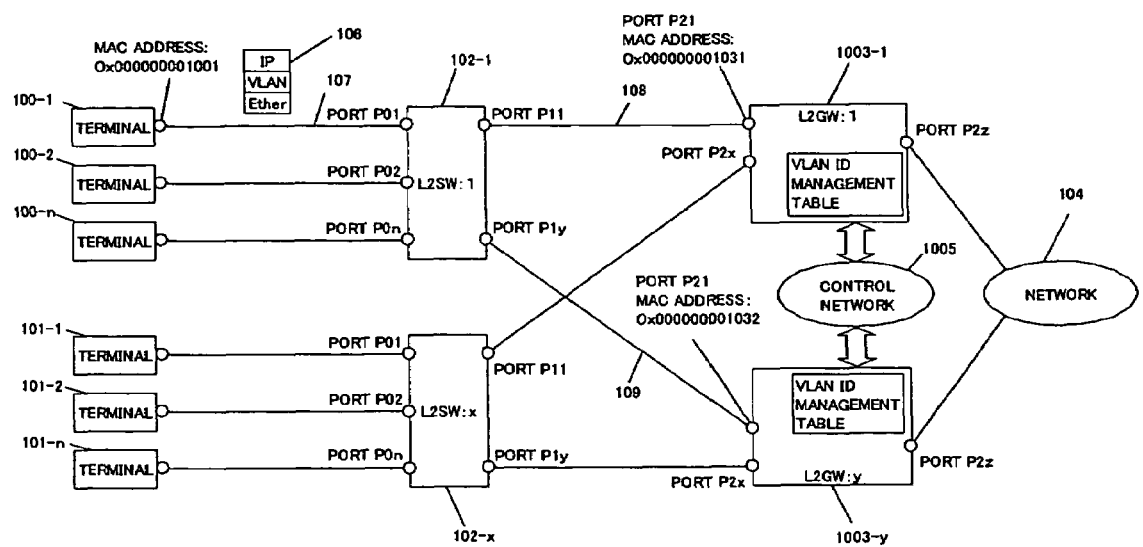

FIG. 8-10 shows the VLAN ID management table provided in the VLAN ID management server 105. The management table includes a VLAN ID 801825, a usage state 801826, and a registered L2GW 801827. The figure shows sample settings.

2. Connection Sequence

Figures 1, 4:
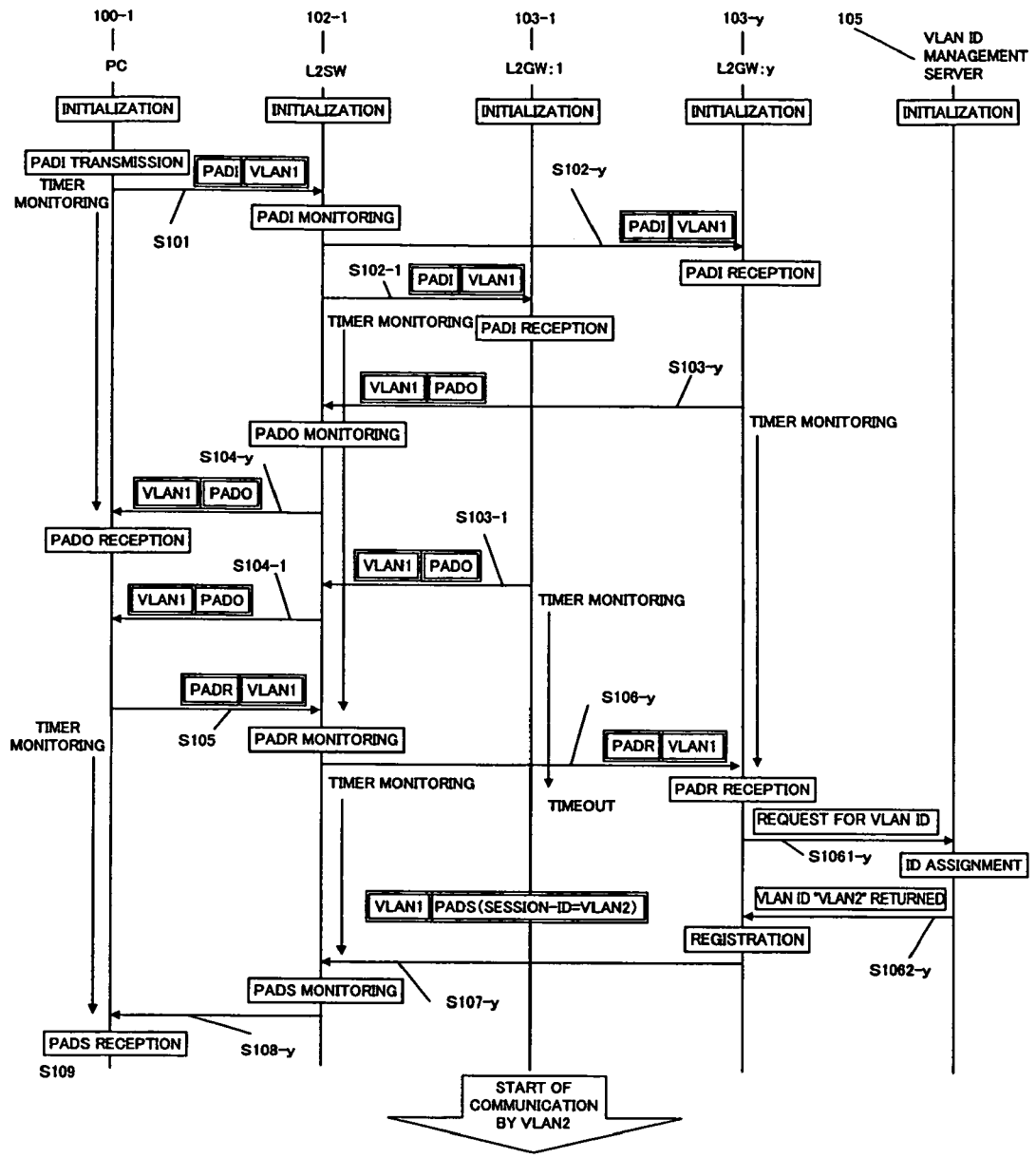
Figures 2, 4:
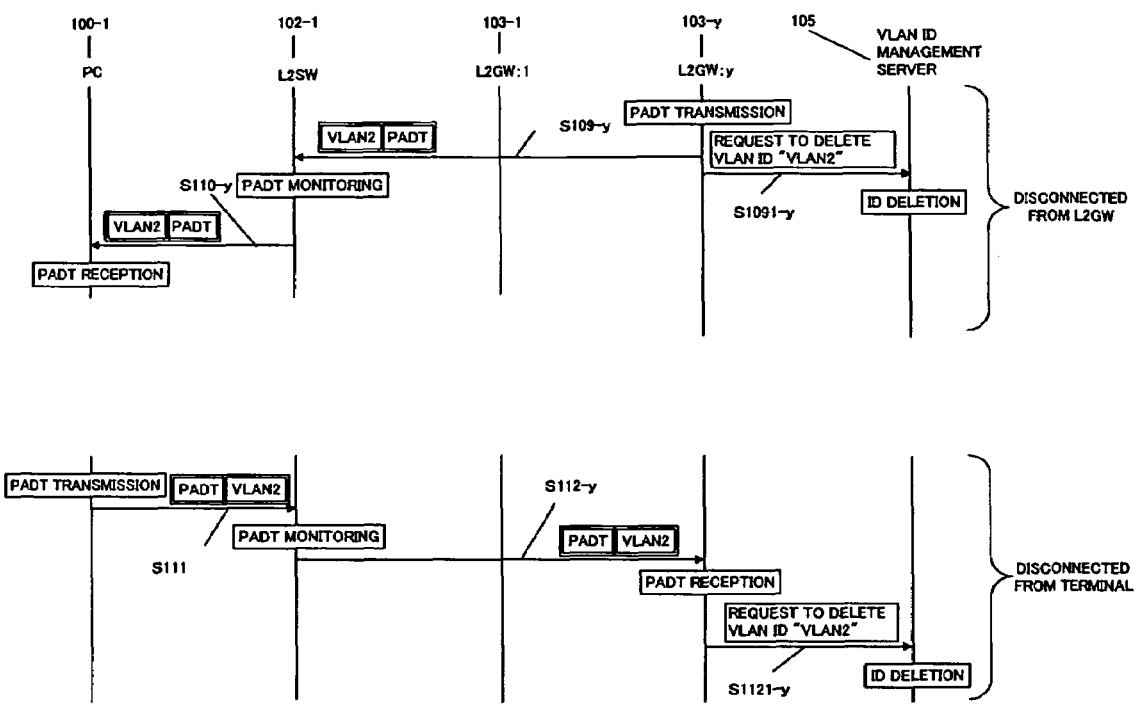

FIG. 4-1 is a connection sequence diagram according to the present invention. The sequence will be described with reference to the sequence diagram.

(1) Initialization

When the system starts up, the apparatuses are initialized.

In the terminals 100-1 to 100-n and 101-1 to 101-n, the connection management table is initialized, as shown in FIG. 9-1. The VLAN ID 901911 is set to the default VLAN ID shared in the system, which is VLAN1, in this embodiment. The L2GW MAC address 9019021 is set to a broadcast address. Nothing is specified as the Service Name 9019031. The connection status 9019041 is set to "DISCONNECTED", and the timer status 9019051 is set to "STOP".

In the L2SWs 102-1 to 102-x, the connection management table and the port management table are initialized as shown in FIGS. 9-7 and 9-14. In the connection management table, the VLAN ID 9019061 is set to the default VLAN ID "VLAN1"; the terminal-side physical port number 9019071, the terminal MAC address 9019081, the L2GW-side physical port number 9019091, and the L2GW MAC address 9019101 are left unregistered; the connection status 9019111 is set to "DISCONNECTED"; and the timer status 90199112 is set to "STOP". In the port management table, the default VLAN ID "VLAN1" is specified for all the physical ports 901931 to 901935, and the VLAN ID of each physical port is specified in accordance with the port management table, so that a VLAN frame can be exchanged. An item broadcast to VLAN1 is output to all the ports, but the L2SW is configured to inhibit broadcast from the terminal 101-1 to anything other than the L2GWs 103-1 to 103-y, as shown in FIG. 8-4. For instance, just broadcast to an upper port can be allowed while broadcast to lower physical ports on the side of the terminal units is inhibited. This configuration suppresses unnecessary broadcast to a user terminal or something other than a specified port and reduces traffic.

In the L2GWs 103-1 to 103-7, the connection management table, port management table, and Service Name decision table are initialized as shown in FIGS. 9-17, 9-21, and 8-9 respectively. In the connection management table, the VLAN ID 9019151 is set to the default VLAN ID "VLAN1"; the terminal MAC address 9019161 and the L2GW physical port number 9019171 are left unregistered; the connection status 9019181 is set to "DISCONNECTED"; and the timer status 9019191 is set to "STOP". In the port management table, "VLAN1" 9019211 to 9019212 is specified for all the physical ports 9019201 and 9019202. In the Service Name decision table, serviceable service names 8018221 to 8018223 are registered.

In the VLAN ID management server 105, the VLAN ID management table is initialized as shown in FIG. 9-24. In the VLAN ID management table, a default VLAN ID flag is specified as the usage state 9019251 and "RESERVE" is specified as the registered L2GW 9019261, for the VLAN ID 9019241. For the other LAN IDs 9019242 and 9019243, the usage states 9019252 and 9019253 and the registered L2GWs 9019262 and 9019263 are set to "NOT USED".

(2) Terminal: PADI Transmission

Figures 1, 5:
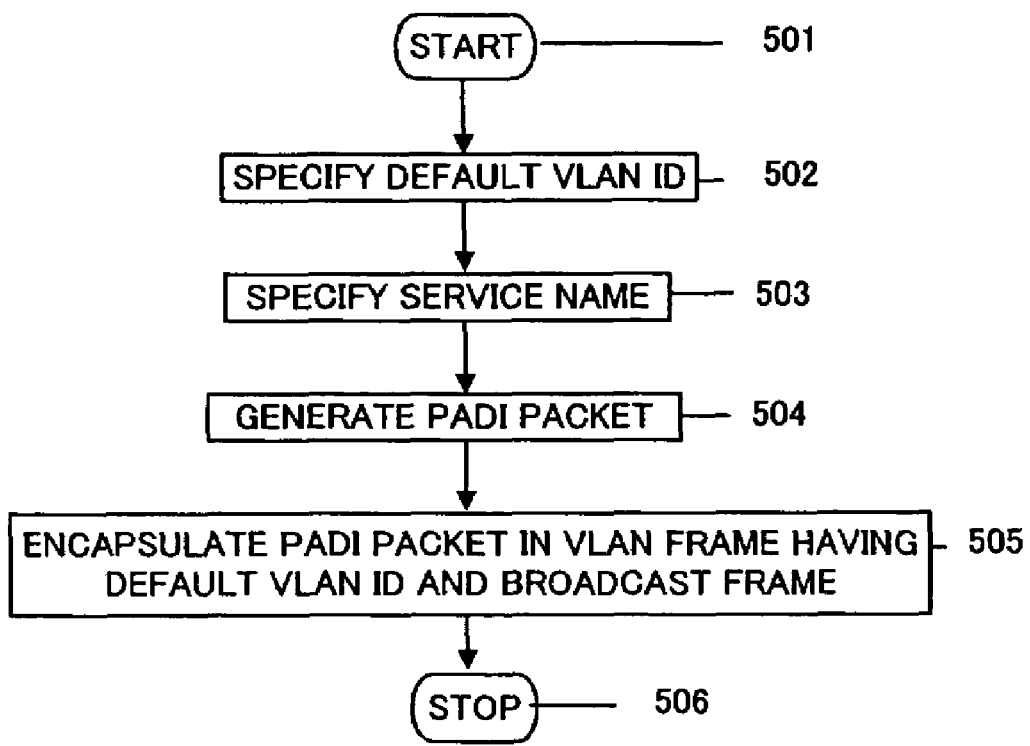
Figures 2, 5:
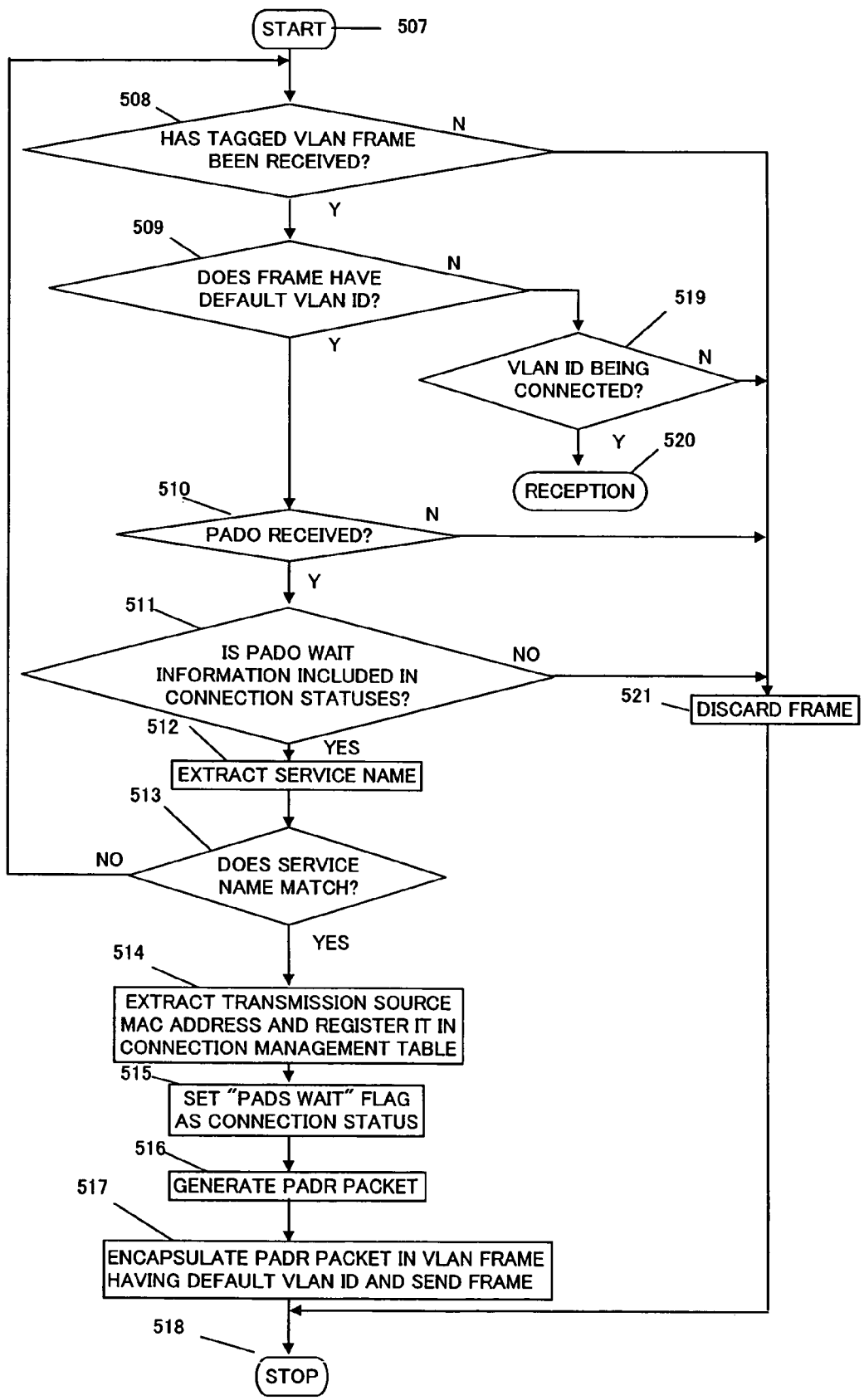
Figures 3, 5:
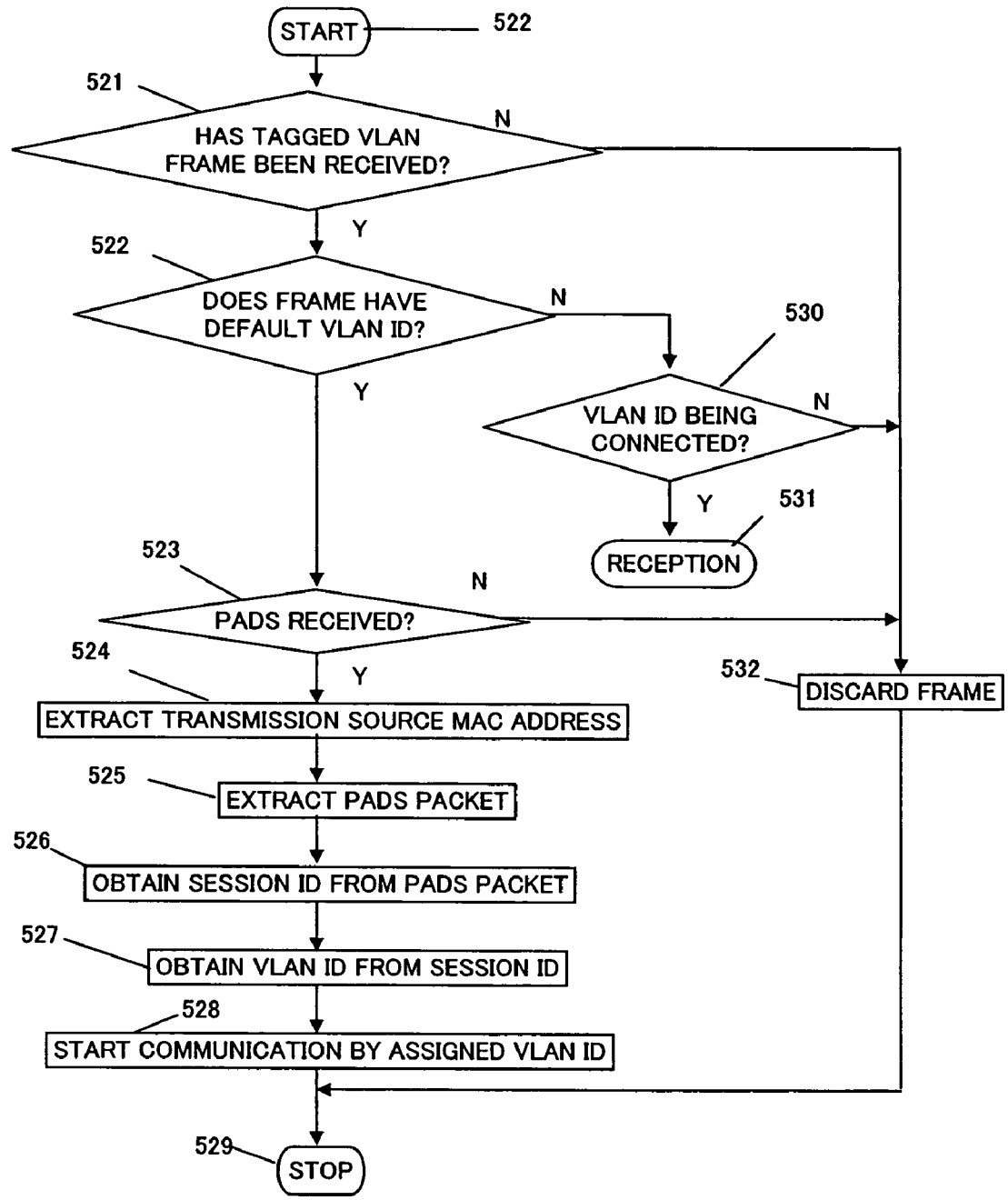
Figures 4, 5:
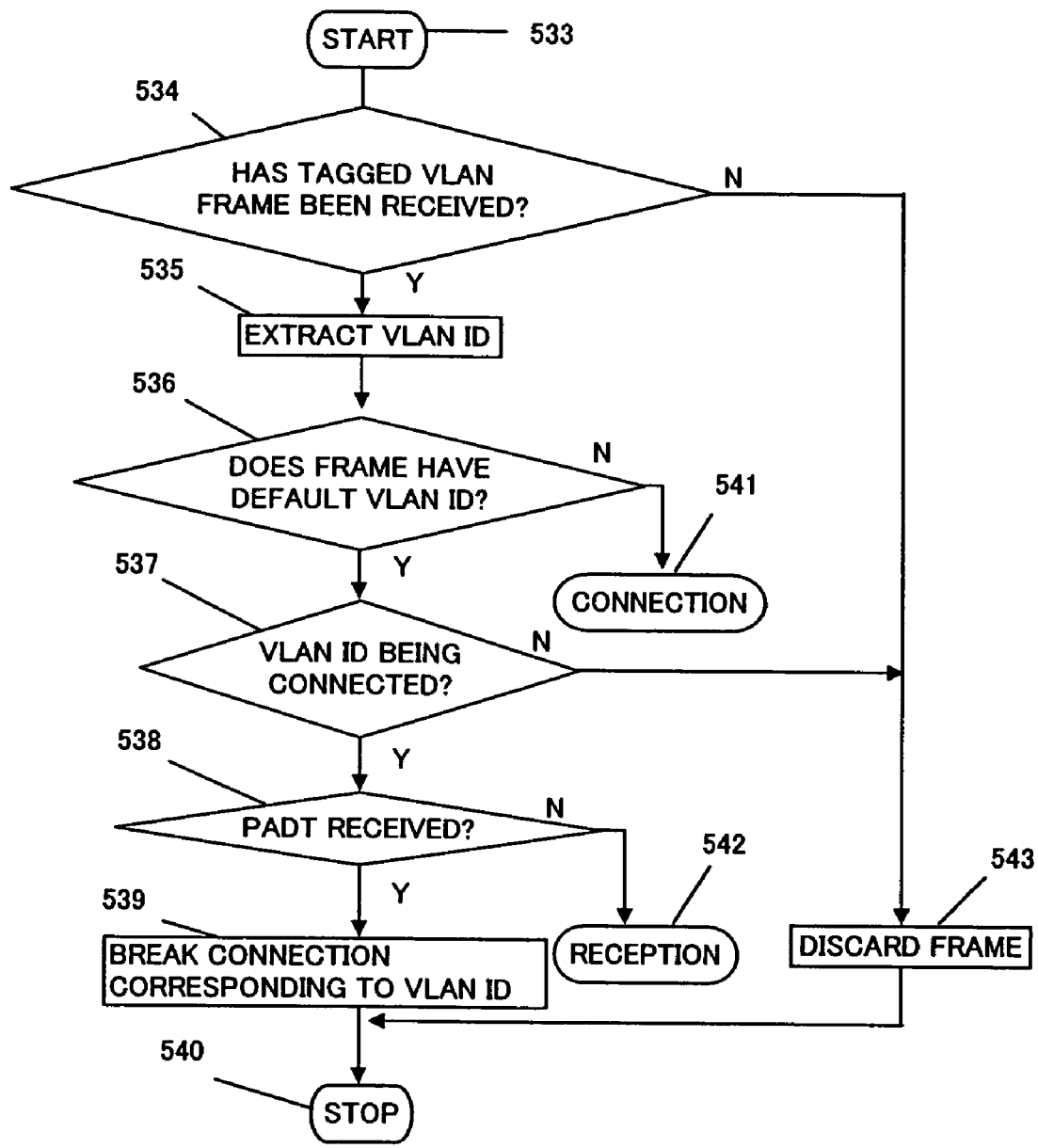
Figure 5:
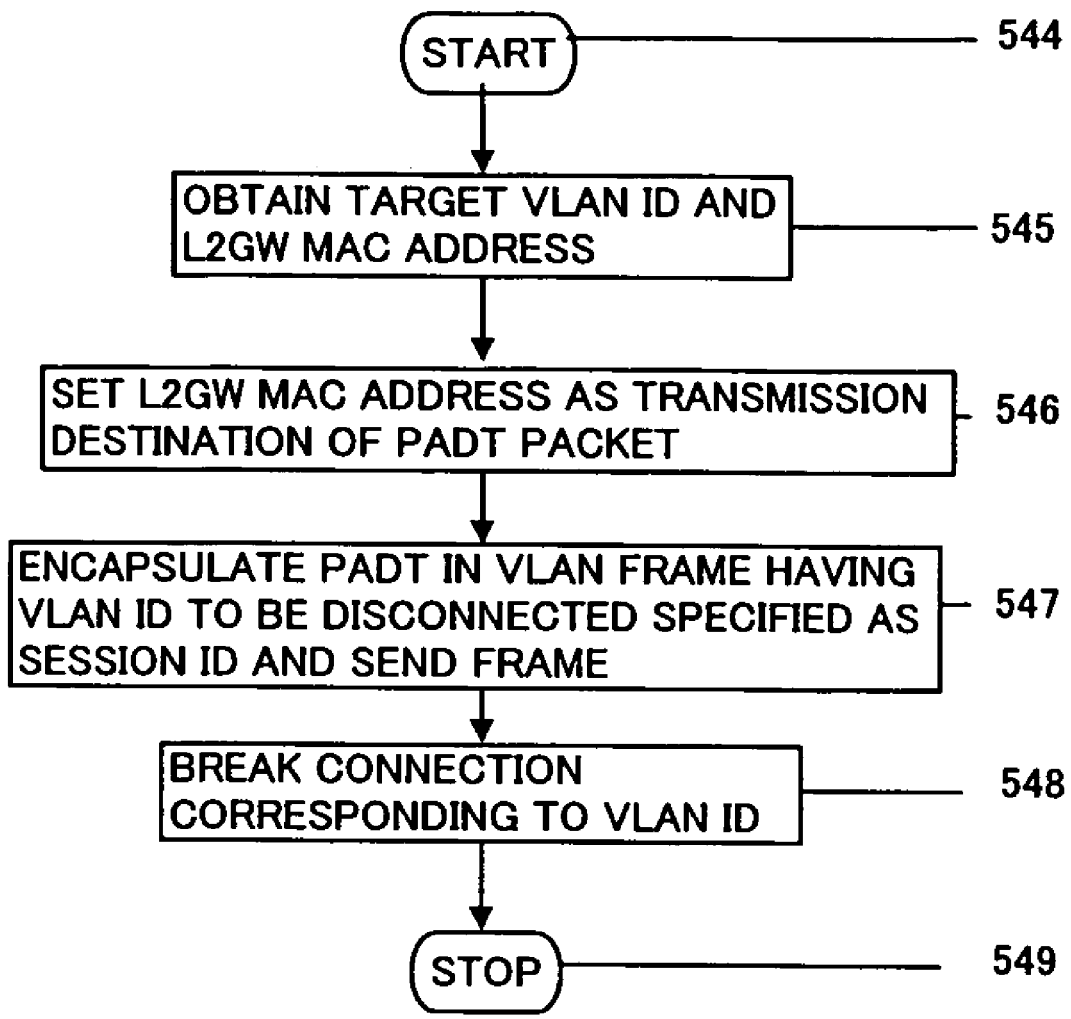

The terminal 101-1 starts a PADI transmission sequence S101. A flow chart of the processing is shown in FIG. 5-1. In this sequence, a PADI packet is generated in accordance with the connection management table shown in FIG. 9-1, and the PADI packet is encapsulated in a tagged VLAN frame having the VLAN ID "VLAN1" and broadcast. The PADI packet contains a VLAN ID, an L2GW MAC address, a Service Name, and others. In the connection management table, the connection status 9019041 is set to "PADO WAIT", and the timer status 9019051 is set to "COUNTING", as shown in FIG. 9-2. Then, the timer is activated, and a response from the L2GW is waited for.

(3) L2SW: PADI Monitoring

Figures 1, 6:
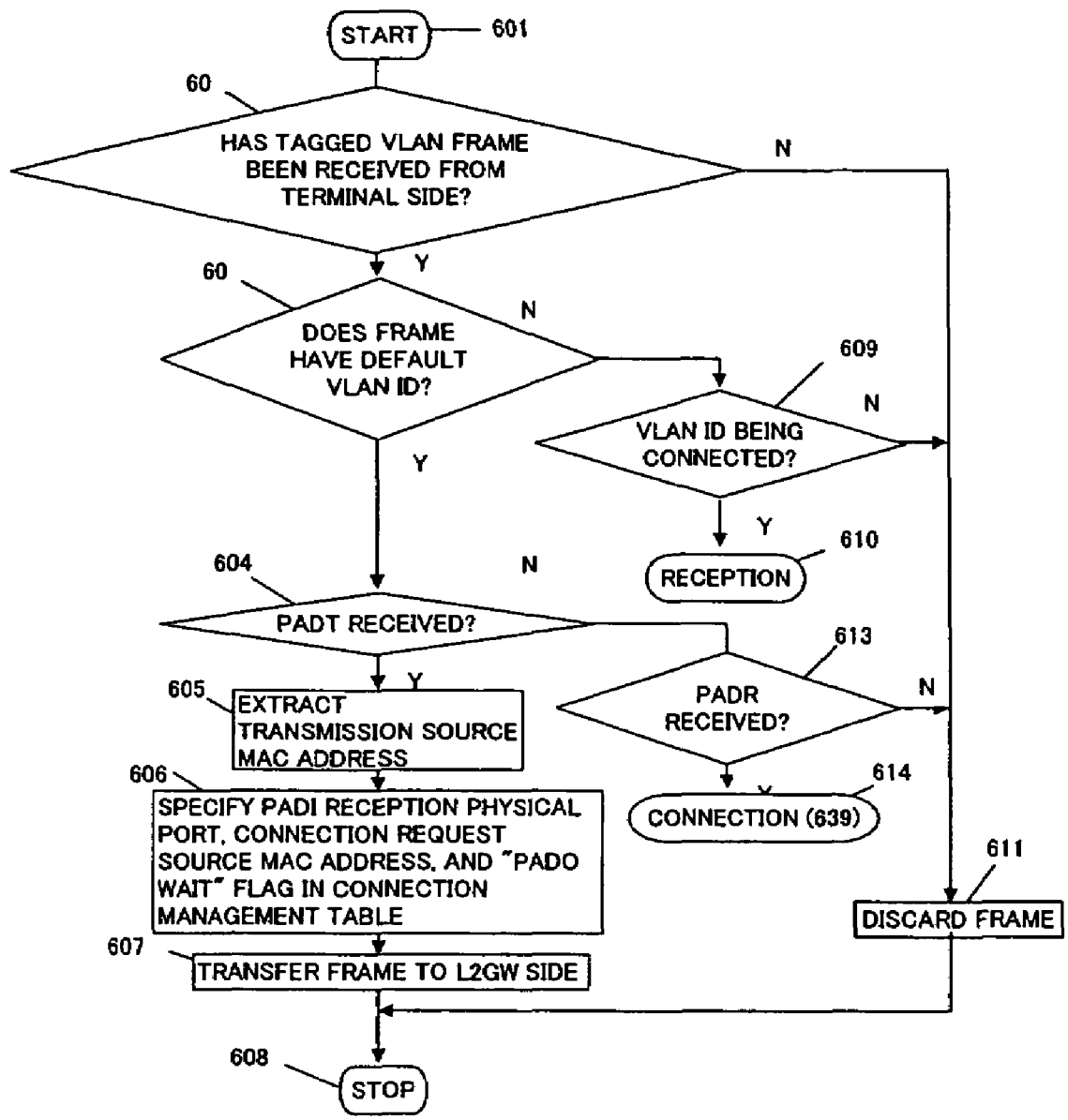
Figures 2, 6:
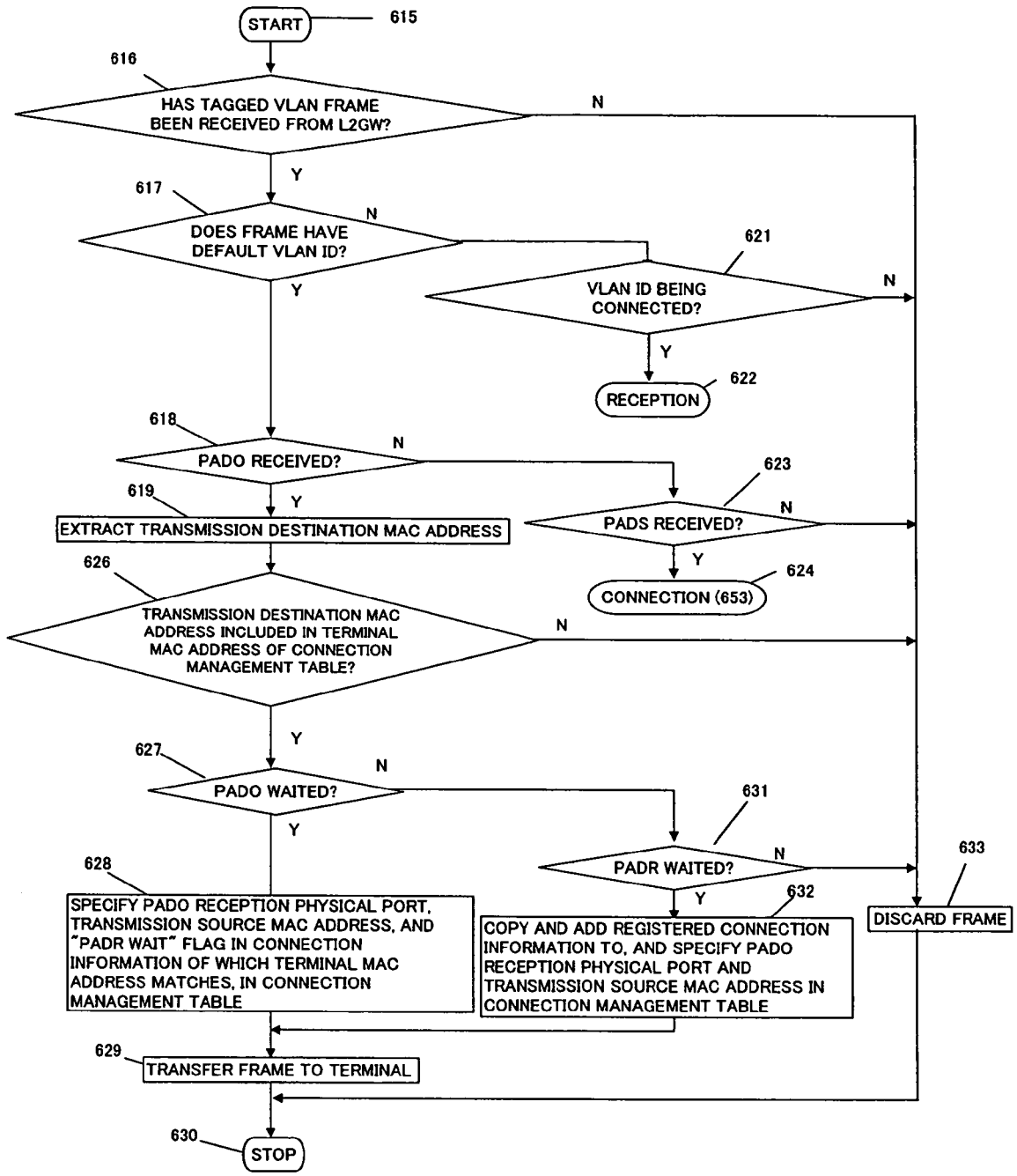
Figures 3, 6:
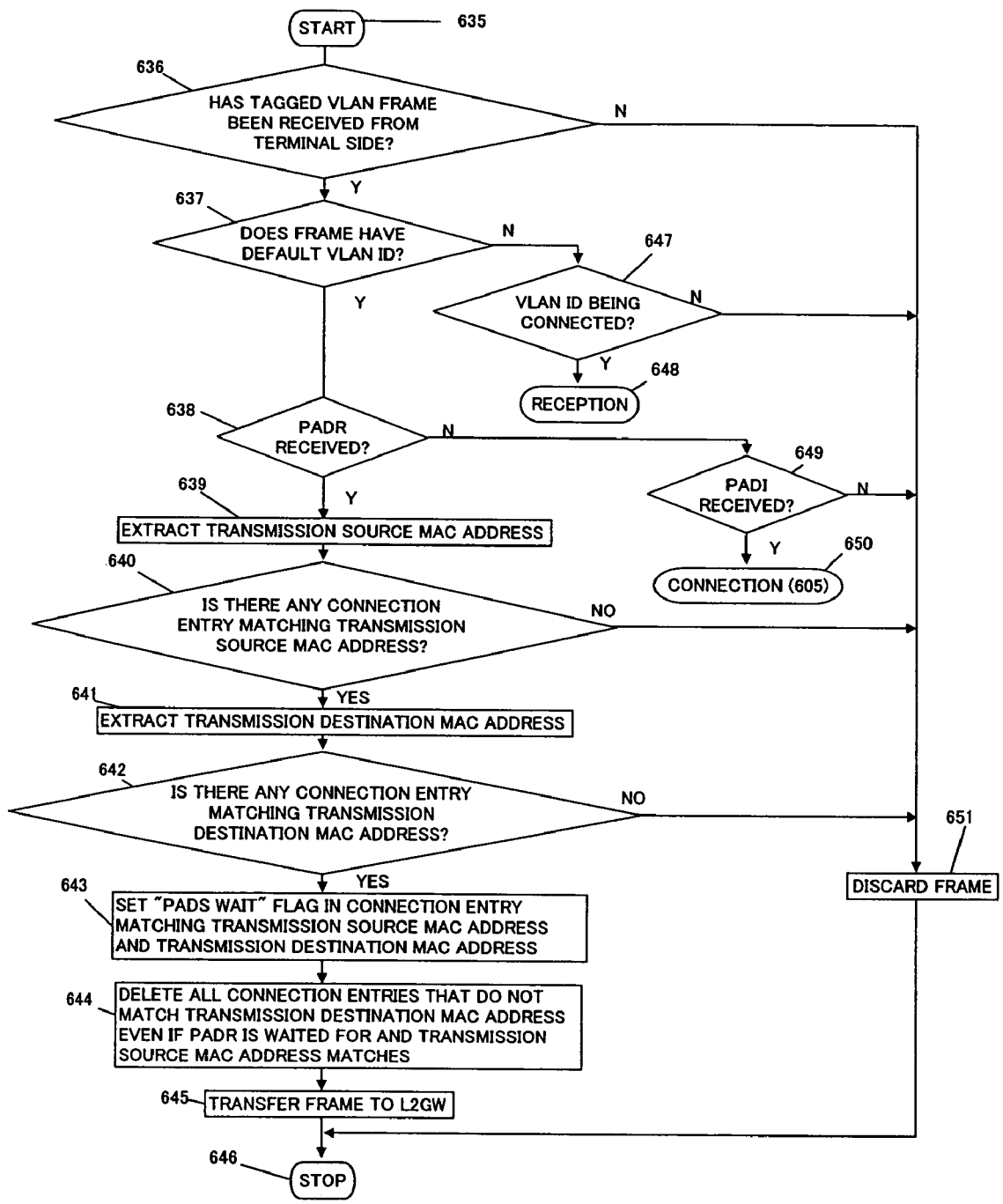
Figures 4, 6:
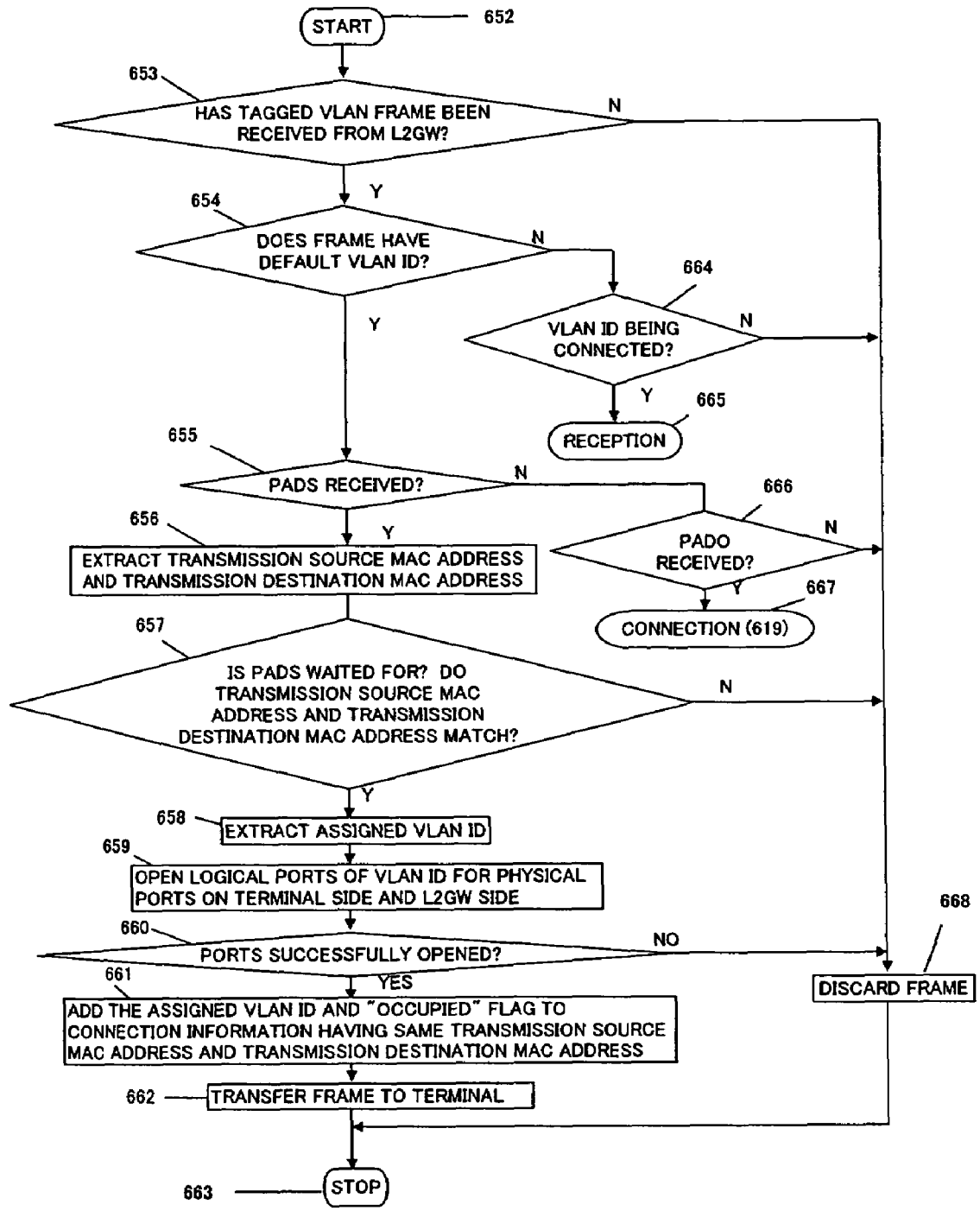
Figures 5, 6:
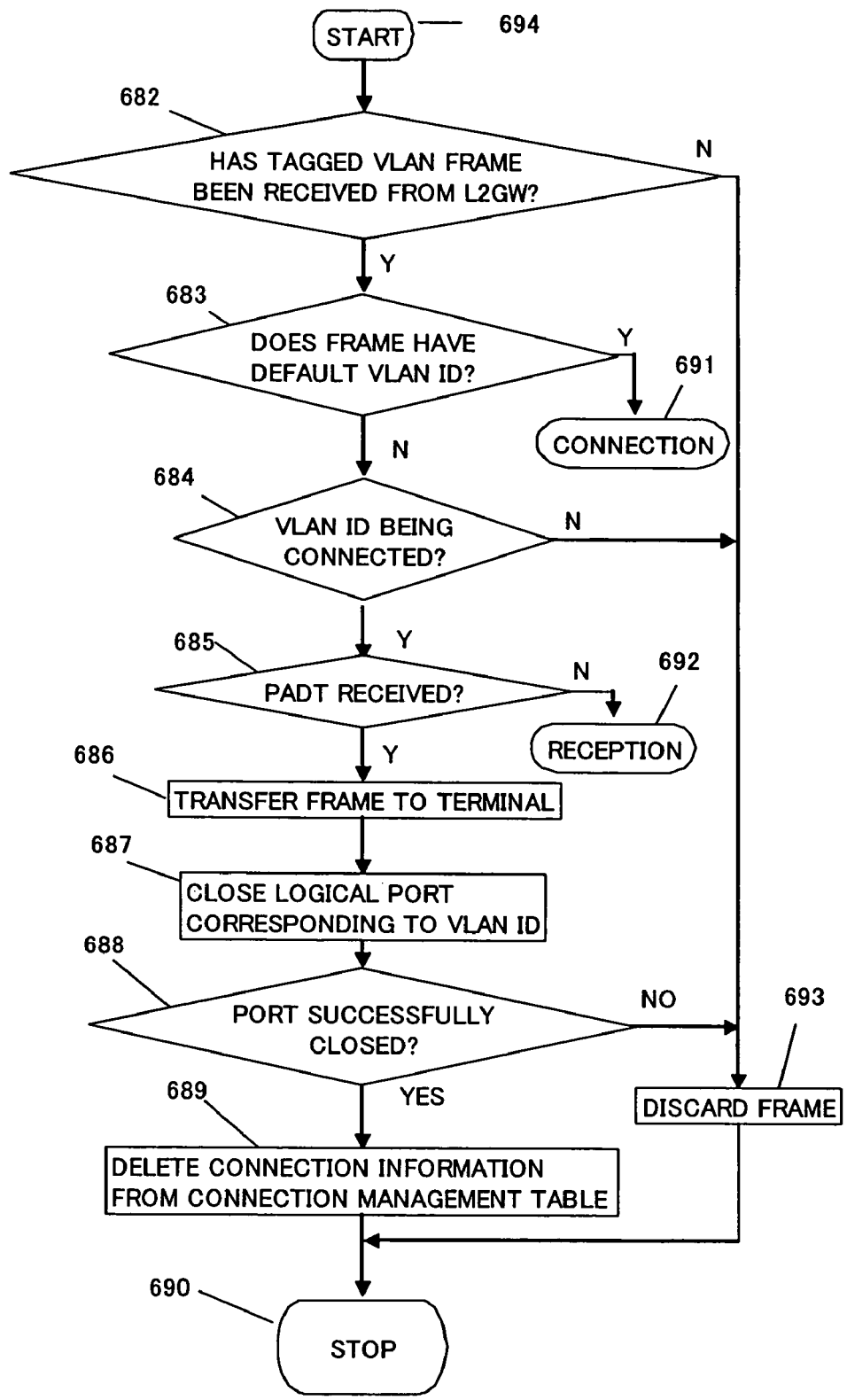
Figure 6:
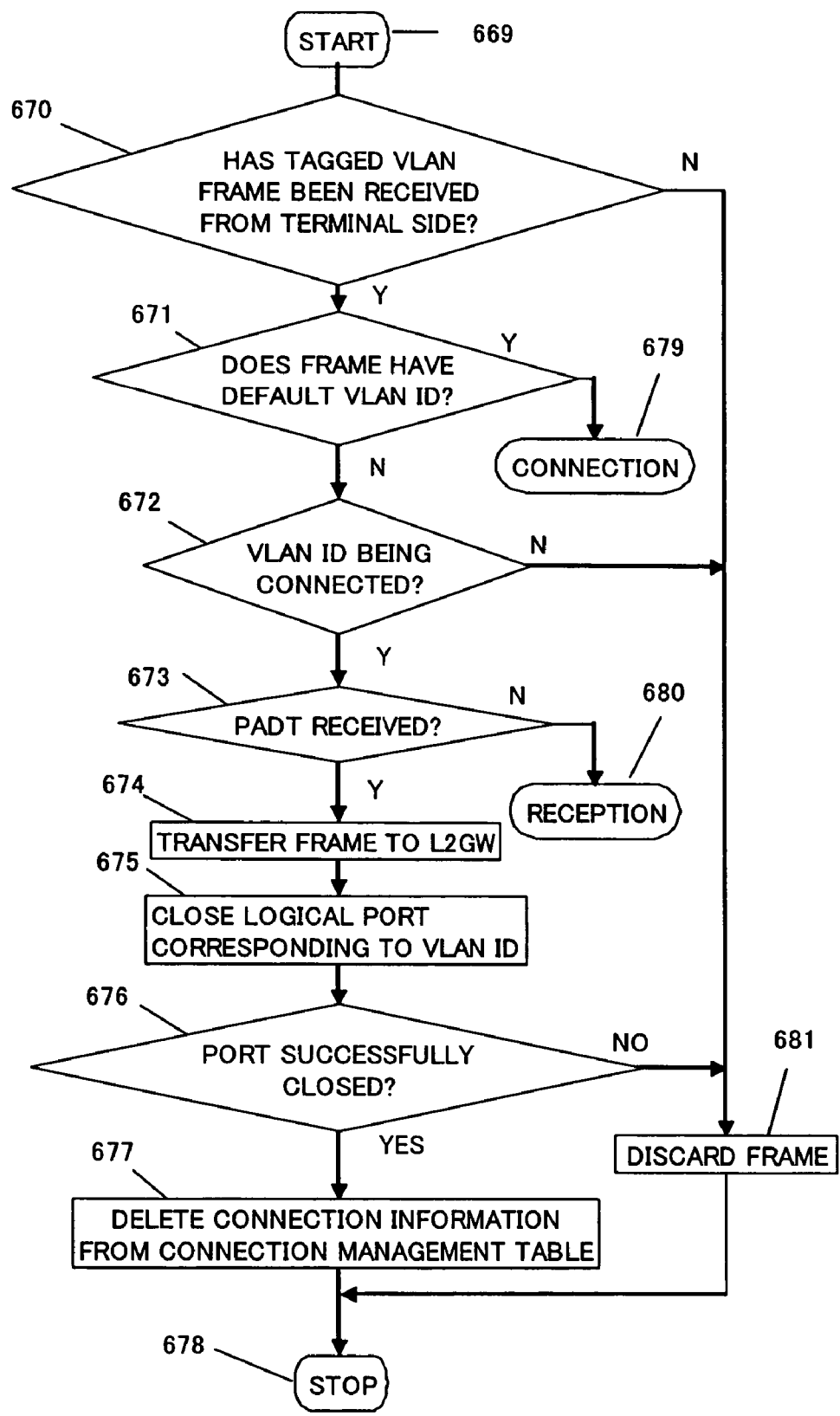

The broadcast frame reaches the L2SW 102-1, and the PADI monitoring sequences S102-1 and S102-y start. A flow chart of the processing is shown in FIG. 6-1. If the received frame is a tagged VLAN frame which has the default VLAN ID "VLAN1" and contains a PADI packet, the VLAN frame is transferred to the L2GWs 103-1 to 103-y. At the time of transfer, the number of the physical port where the frame is received "P01" and the transmission source MAC address "0x000000001001" are specified as the terminal-side physical port number 9019071 and the terminal MAC address 9019081, in the connection management table, as shown in FIG. 9-8. The connection status is set to "PADO WAIT", and the timer status is set to "COUNTING". Then, the timer is activated, and the L2SW starts monitoring a PADO from the L2GWs. A VLAN ID frame which is being connected but does not meet the conditions given above is handled as a normal VLAN frame in step 610. A default VLAN ID frame containing a PADR packet is handled in PADR monitoring in step 639. The other frames are discarded in step 611, and the PADI monitoring sequence ends. In the VLAN frame transfer to the L2GW, the port management table as shown in FIG. 8-3 is referenced, and the frame can be transferred only to a physical port having the default VLAN ID, as shown in FIG. 8-4. For instance, the frame can be transferred to an upstream L2GW and not to a downstream physical port on the side of the terminal units.

(4) L2GW: PADI Reception

The broadcast frame reaches the L2GWs 103-1 to 103-y, which individually start the PADI reception sequences S103-1 and S103-y. A flow chart of the processing is shown in FIG. 7-1. If the received frame is a tagged VLAN frame which has the default VLAN ID "VLAN1" and contains a PADI packet, a Service Name match decision 706 is made in this sequence. "NONE" in FIG. 8-9 means that at least a connection is identified.

If the Service Name extracted from the PADI packet does not match any data stored in the service decision table shown in FIG. 8-9, the frame is discarded in step 712, and the PADI reception sequence ends. If the Service Name matches any data, the number of the physical port where the frame is received "P21" and the transmission source MAC address "0x000000001001" are specified as the L2GW physical port number 9019171 and the terminal MAC address 9019161 in the connection management table, as shown in FIG. 9-18. In addition, the connection status is set to "PADR WAIT" and the timer status is set to "COUNTING", and the PADO packet transmission of step 708 is performed. The timer is activated, and the L2GW waits for a PADR response from the terminal. An example for the L2GW 103-y has been described here, and the same processing is performed for the L2GW 103-1. A VLAN frame which does not meet the conditions given above and has a VLAN ID being connected is handled as a normal VLAN frame in step 711. The other frames are discarded in step 712, and the PADI reception sequence ends.

(5) L2SW: PADO Monitoring

When default VLAN frames containing PADO from the L2GWs 103-1 and 103-y reach the L2SW 102-1, the PADO monitoring sequences S104-1 and S104-y start. A flow chart of the processing is shown in FIG. 6-2. If the received frame is a tagged VLAN frame which has the default VLAN ID and contains a PADO packet and if the transmission destination MAC address extracted in step 619 is contained in the terminal MAC address 9019081 and the connection status is "PADO WAIT" 9019111 in the connection management table, as shown in FIG. 9-8, the number of the physical port where the frame is received "P1y" and the transmission source MAC address "0x000000001032", and "PADR wait" are specified respectively as the L2GW-side physical port number 9019091, the L2GW MAC address 9019101, and the connection status 9019111, as shown in FIG. 9-9, and the frame transfer to the terminal is performed in step 629. When a default VLAN frame containing PADO is received from the L2GW 103-1, if the extracted transmission destination MAC address is included in the connection management table, and if the connection status is "PADR WAIT", in step 631, the connection information 9019062 to 9019122 of the L2GW 103-1 is added to the connection management table, as shown in FIG. 9-10. The VLAN ID, terminal-side physical port number, terminal MAC address, connection information, and timer status are taken from the connection information which includes the extracted transmission destination MAC address and the connection status "PADR WAIT". The L2GW-side physical port number and the L2GW MAC address are set to the physical port number and the MAC address to which the L2GW 103-1 is connected. Then, the frame transfer to the terminal is performed. Each time a default VLAN frame containing PADO is received and it is checked that the extracted transmission destination MAC address is included in the connection management table and that the connection status is "PADR WAIT", the sequence described above is repeated. A VLAN ID frame which does not meet the conditions described above and is being connected is handled as a normal VLAN frame in step 622. A default VLAN ID frame containing a PADS packet is handled in a PADS monitoring sequence of step 653. The other frames are discarded in step 633, and the PADI monitoring sequence ends.

(6) Terminal: PADO Reception

The frame reaches the terminal 101-1, and a PADO reception sequence S105 starts. A flow chart of the processing is shown in FIG. 5-2. This sequence checks if the received frame is a tagged VLAN frame, if the frame has the default VLAN ID, if the frame contains a PADO packet, if the connection status in the connection management table is "PADO WAIT" 9019041, as shown in FIG. 9-2, and if the Service Name extracted from the PADO packet in step 512 is registered. Then, the L2GW MAC address 9019021 is set to the transmission source MAC address "0x000000001032" in step 514, as shown in FIG. 9-3; the "PADS wait" flag 9019041 is set in step 515, as shown in FIG. 9-4; a PADR packet corresponding to the transmission source address is generated in step 516; and the packet is contained in a tagged VLAN frame having the default VLAN ID and sent to the L2GW 103-y. If the frame has a VLAN ID being connected, the frame is received in step 520. The other frames are discarded in step 521. If the Service Name does not match, the next frame will be processed. When the terminal enters the PADS wait state next or when a timeout of the PADO wait timer occurs next, the PADO reception sequence ends. The L2GW 103-1 also sends a PADO packet, but the corresponding frame will be discarded when the terminal enters the PADS wait state.

(7) L2SW: PADR Monitoring

Figure 11:
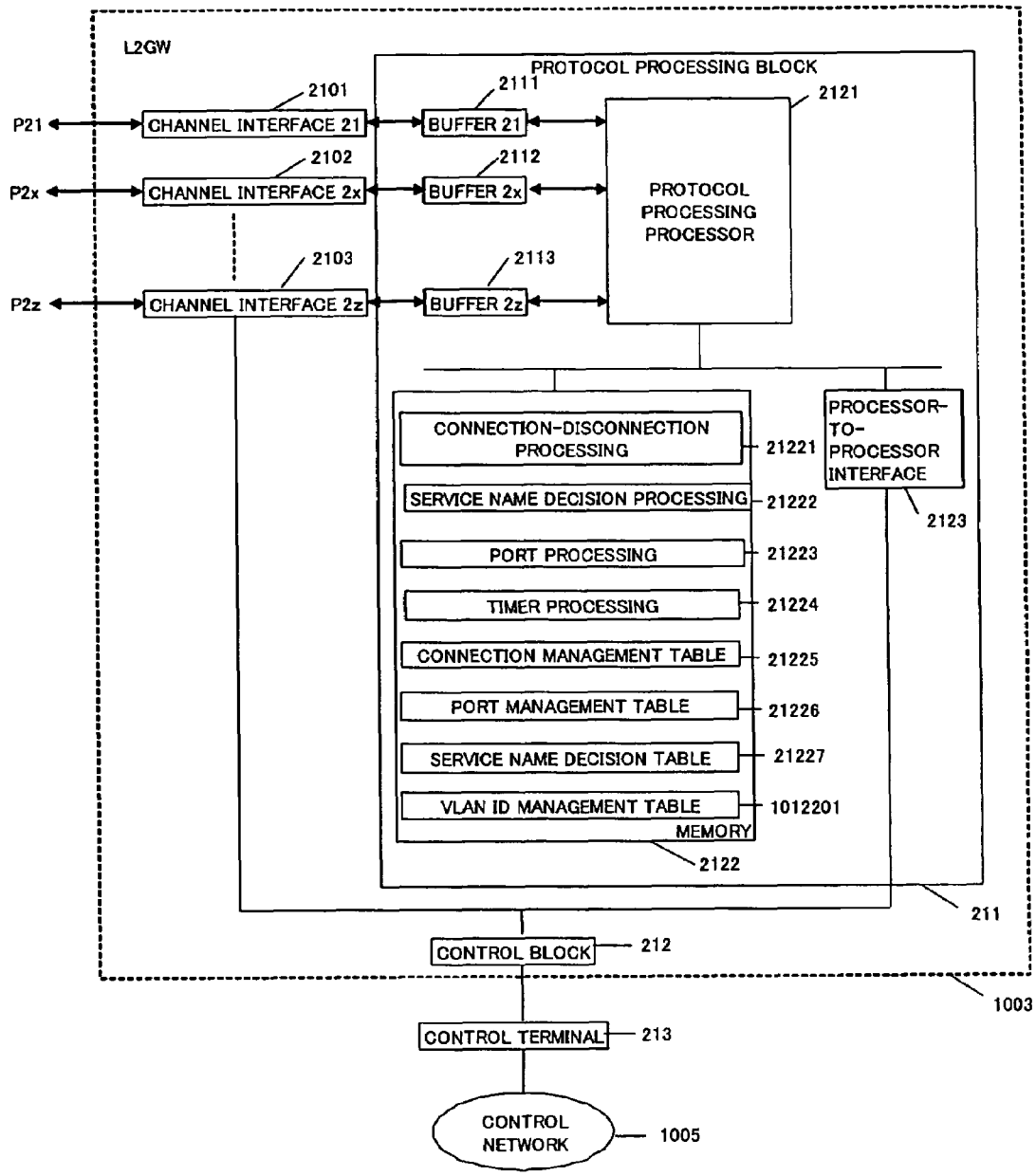

The frame reaches the L2SW 102-1, and a PADR monitoring sequence S106-*y* starts. A flow chart of the processing is shown in FIG. 6-3. This sequence checks if the received frame is a tagged VLAN frame having a default VLAN ID, if the frame contains a PADR packet, and if the transmission source MAC address and the transmission destination MAC address extracted from the PADR packet in step 639 match the terminal MAC address 901907 and the L2GW MAC address 901910 respectively in the connection management table as shown in FIG. 9-11. Then, the corresponding connection status 9019111 is set to "PADS WAIT" in step 643; the PADR wait timer is stopped; a PADS wait timer is activated to bring the connection into the PADS wait state; and the rifle is transferred to the L2GW 103-*y* in step 645. If the transmission source MAC address extracted from the PADR packet matches the terminal MAC address 9019072 in the connection management table, as shown in FIG. 9-11, and if the transmission destination MAC address extracted from the PADR packet does not match the L2GW MAC address 9019102 in the connection management table, as shown in FIG. 9-11, the connection information is deleted in step 644. A VLAN ID frame which does not meet the conditions given above and is being connected is handled as a normal VLAN frame in step 648. A default VLAN ID frame containing a PADI packet is handled in a PADI monitoring sequence of step 605. The other frames are discarded in step 651, and the PADR monitoring sequence ends.

(8) L2GW: PADR Reception

The frame reaches the L2GW 103-*y*, and a PADR reception sequence S107-*y* starts. A flow chart of the processing is shown in FIG. 7-2. This sequence checks if the received frame is a tagged VLAN frame having a default VLAN ID, if the frame contains a PADR packet, and if the transmission source MAC address extracted from the PADR packet matches the terminal MAC address 901916 in the connection management table, as shown in FIG. 9-19. Then, a request for a VLAN ID is made to the VLAN ID management server 105 in sequence S1061-*y*.

(9) VLAN ID Management Server: ID Assignment

The VLAN ID management server 105 chooses any ID 9019242 from unused IDs in the VLAN ID management table, as shown in FIG. 9-24; sets an "OCCUPIED" flag as the usage state 9019252 in the VLAN ID management table, as shown in FIG. 9-25; sets the assigned L2GW 103-*y* as the registered L2GW 9019262, as shown in FIG. 9-25; and reports the assigned VLAN ID to the L2GW 103-*y* in sequence S1062-*y*. In this embodiment, the assigned VLAN ID is VLAN2.

(10) L2GW: Registration

The L2GW 103-*y* opens a VLAN port for the physical port of the L2GW physical port number "P21" in the connection management table as shown in FIG. 9-19, and adds the VLAN ID "VLAN2" as the corresponding physical port number in the L2GW port management table, as shown in FIG. 9-22. The VLAN ID 9019151 is set to the assigned VLAN ID "VLAN2", and the connection status 9019181 is set to "CONNECTING", in the connection management table, as shown in FIG. 9-19. A PADS packet having the VLAN ID "VLAN2" as a session ID is generated, encapsulated in a default VLAN frame, and transferred to the terminal 101-1. If the VLAN port cannot be successfully opened, the corresponding connection information is deleted from the connection management table in step 728. If a timeout of the PADR wait timer occurs, the corresponding connection information is deleted. A VLAN ID frame which does not meet the conditions given above and is being connected is processed as a normal VLAN frame in step 730. The other frames are discarded in step 727, and the PADR reception sequence ends.

(11) L2SW: PADS Monitoring

The frame reaches the L2SW 102-1, and a PADS monitoring sequence S108-*y* starts. A flow chart of the processing is shown in FIG. 6-4. This sequence checks if the received frame is a tagged VLAN frame having a default VLAN ID, if the frame contains a PADS packet, if the transmission source MAC address and transmission destination MAC address extracted from the PADS packet match the L2GW MAC address 901910 and the terminal MAC address 901908 in the connection management table, as shown in FIG. 9-11, and if the corresponding connection is in the PADS wait state. Then, the session ID "VLAN2" is extracted from the PADS packet; the VLAN ports of the assigned VLAN ID are opened for the physical ports of the terminal-side physical port number 901907 and the L2GW-side physical port number 901909 of the connection management table, as shown in FIG. 9-12, in step 659. The VLAN ID 9019061 is set to the assigned VLAN ID "VLAN2"; the connection status 9019111 is set to "CONNECTING"; and the timer status 9019121 is set to "HALT", in step 661. The assigned VLAN ID "VLAN2" is set to the physical ports 9019141 and 9019145 for which the VLAN ports of the port management table shown in FIG. 9-15 have been opened. The received frame is transferred to the terminal side in step 662. If any of the VLAN ports cannot be successfully opened, the corresponding connection information is deleted from the connection management table. A VLAN ID frame which does not meet the conditions given above and is being connected is handled as a normal VLAN frame in step 665. A tagged VLAN frame which has the default VLAN ID and contains a PADO packet is handled in a PADO monitoring sequence of step 619. The other frames are discarded in step 668. If a timeout of the PADS wait timer occurs, the corresponding connection information is deleted. Then, the PADR reception sequence ends.

(12) Terminal: PADS Reception

The frame reaches the terminal 101-1, and a PADS reception sequence of S109 starts. A flow chart of the processing is shown in FIG. 5-3. This sequence checks if the received frame is a tagged VLAN frame having the default VLAN ID, if the frame contains a PADS packet, and if the extracted transmission source MAC address matches an L2GW MAC address in the connection management table, as shown in FIG. 9-4. Then, the VLAN ID "VLAN2" assigned from the session ID extracted from the PADS packet is specified as the VLAN ID 9019011 of the corresponding connection information in the connection management table, as shown in FIG. 9-5; the connection status 9019041 is set to "CONNECTING"; the timer status 9019051 is set to "STOP"; and the sequence ends. If a timeout of the PADS wait timer occurs, the corresponding connection information is deleted from the connection management table.

(13) Communication

Now, the terminal 101-1 and the -L2GW 103-*y* communicate through the L2SW 102-1, using the assigned VLAN ID on the VLAN network. Any protocol using the Ethernet (registered trademark) frame can be used for the communication. If IP is used, an IP address is obtained by DHCP, and an authentication system such as Radius can be combined to provide a variety of services. The user terminal belongs to a unique VLAN network, and broadcast to a port outside VLAN2 is suppressed, as shown in FIGS. 8-5 and 8-6, so that the network load can be reduced. With Service Name, the connection destination and connection route of each service can be limited, and the network can be effectively used.

3. Disconnection Sequence

Disconnection processing will be described. A PADT packet of the PPPoE protocol is used in the disconnection processing. The processing can be started from either the terminal or the L2GW.

3-1. Disconnection from the L2GW (1) L2GW: PADT Transmission

If a disconnection is made from the L2GW, the L2GW 103-$y$ starts a PADT transmission sequence S109-$y$. A flow chart of the processing is shown in FIG. 7-3. The VLAN ID and terminal MAC address of the terminal 101-1 to be disconnected are selected from the connection management table, as shown in FIG. 9-19; a PADT packet is generated with the session ID set to the VLAN ID to be disconnected "VLAN2", the transmission destination MAC address set to the terminal MAC address, and the transmission source MAC address set to the MAC address corresponding to the L2GW physical port number associated with the terminal; and the packet is encapsulated in a tagged VLAN frame having the VLAN ID "VLAN2" to be disconnected and sent to the terminal 101-1. After the frame is sent, the VLAN port to which "VLAN2" is assigned is closed, and the VLAN ID management server is requested to delete the VLAN ID, in a sequence S1091-$y$. The L2GW 103-$y$ also initializes the connection information corresponding to the VLAN ID to be disconnected in the connection management table, as shown in FIG. 9-20, and the VLAN ID is deleted from the physical port management table, as shown in FIG. 9-23.

(2) VLAN ID server: ID deletion

The VLAN ID management server deletes the specified VLAN ID from the VLAN ID management table, as shown in FIG. 9-26.

(3) L2SW: PADT Monitoring

The L2SW 102-1 receives the frame and starts a PADT monitoring sequence of S110-$y$. A flow chart of the processing is shown in FIG. 6-5. This sequence checks if the received frame is a tagged VLAN frame having a VLAN ID being connected and if the frame contains a PADT packet. Then, the received frame is transferred to the terminal 101-1. In the connection management table, the VLAN ID 9019061 is set to the default VLAN ID; the terminal-side physical port number 9019071, the terminal MAC address 9019081, the L2GW-side physical port number 9019091, and the L2GW MAC address 9019101 are set to "NOT REGISTERED", and the connection status 9019111 is set to "NOT CONNECTED", as shown in FIG. 9-13. Another frame having a VLAN ID being connected is received in step 692. A frame having the default VLAN ID is subjected to connection processing in step 691. The other frames are discarded in step 693.

(4) Terminal: PADT Reception

The terminal 101-1 receives the frame and starts a PADT reception sequence. A flow chart of the processing is shown in FIG. 5-4. This sequence checks if the received frame is a tagged VLAN frame having VLAN ID "VLAN2" being connected and if the frame contains a PADT packet. Then, the VLAN port is closed, and the connection information is deleted from the connection management table, as shown in FIG. 9-6. In this example, the corresponding table is deleted or initialized. If the received frame is a tagged VLAN frame which has a VLAN ID being connected and something other than a PADT packet, the frame is received in step 542. If the frame has the default VLAN ID, the frame is subjected to connection processing in step 541. The other frames are discarded in step 543.

3-2. Disconnection from the Terminal (1) Terminal: PADT Transmission

If a disconnection is made from the terminal, the terminal 101-1 starts a PADT transmission sequence S111. A flow chart of the processing is shown in FIG. 5-5. This sequence determines the VLAN-ID or L2GW to be disconnected; obtains the VLAN ID 901901 and the L2GW MAC address 901902 from the connection management table as shown in FIG. 9-5; generates a PADT packet with the session ID set to the VLAN ID "VLAN2" to be disconnected, the transmission destination MAC address set to the L2GW MAC address, the transmission source MAC address set to the terminal MAC address; encapsulates the packet in a tagged VLAN frame having the VLAN ID "VLAN2" and sends it to the L2GW 103-$y$. After the frame is sent, the VLAN port to which "VLAN2" is assigned is closed, and the connection information corresponding to the VLAN ID to be disconnected is deleted from the connection management table, as shown in FIG. 9-6.

(2) L2SW: PADT Monitoring

The L2SW 102-1 receives the frame and starts a PADT monitoring sequence S112-$y$. A flow chart of the processing is shown in FIG. 6-6. This sequence checks if the received frame is a tagged VLAN frame having the VLAN ID "VLAN2" being connected and if the frame contains a PADT packet. Then, the received frame is transferred to the L2GW 103-$y$. In the connection management table shown in FIG. 9-13, the VLAN ID 9019061 is set to the default VLAN ID; the terminal-side physical port number 9019071, the terminal MAC address 9019081, the L2GW-side physical port number 9019091, and the L2GW MAC address 9019101 are set to "NOT REGISTERED", and the connection status 9019111 is set to "NOT CONNECTED". Another frame having a VLAN ID being connected is received in step 680. A frame having the default VLAN ID is subjected to connection processing in step 679. The other frames are discarded in step 681.

(3) L2GW: PADT Reception

The L2GW 103-$y$ receives the frame and starts a PADT reception sequence. A flow chart of the processing is shown in FIG. 7-4. This sequence checks if the received frame is a tagged VLAN frame having a VLAN ID being connected and if the frame contains a PADT packet. Then, the VLAN ID is extracted from the received frame; the VLAN port of the physical port to which the VLAN ID is assigned in the connection management table is closed; and a request to delete the VLAN ID is made to the VLAN ID management server in sequence S1121-$y$. The L2GW 103-$y$ also initializes the connection information corresponding to the VLAN ID to be disconnected in the connection management table, as shown in FIG. 9-20, and the VLAN ID to be disconnected is deleted from the physical port management table, as shown in FIG. 9-23.

(4) VLAN ID Management Server: ID Deletion

The VLAN ID management server deletes the specified VLAN ID from the VLAN ID management table.

B. Second Embodiment

The VLAN ID management table of the first embodiment is on the VLAN ID management server while the VLAN ID management table of a second embodiment is in L2GWs.

FIG. 10 shows a network configuration of the second embodiment. As shown in the figure, the network includes user terminal units 100-1 to 100-n and 101-1 to 101-n, L2SWs 102-1 and 102-x for serving the terminal units, L2GWs 1003-1 and 1003-y for serving the L2SWs, a host network 104 connected to the L2GWs, and a control network 1005 for connecting the L2GWs. A tagged VLAN frame 106 is used for communication from the terminal units 100-1 to 100-n and 101-1 to 101-n to the host network 104, and an IP packet and other data are transferred in the tagged VLAN frame. The L2GWs 1003-1 to 1003-y contain one VLAN ID management table each, and the VLAN ID management tables can be synchronized through the control network 1005 at any timing. The tables may also be synchronized through the host network.

FIG. 11 shows the configuration of the L2GWs 1003-1 and 1003-y of the second embodiment. The L2GWs 1003-1 and 1003-y include a plurality of input-output channel interfaces 2101 and 2102, a channel interface 2103 connected to the host network, a protocol processing block 211, and a control block 212 for controlling the protocol processing block 211. The control block 212 monitors the status of the protocol processing block 211, reports the status to a control terminal 213, sets control parameters of the protocol processing block 211 in response to an instruction from the control terminal 213, and transfers a frame received from the protocol processing block 211 to the channel interfaces 2101 to 2103 containing output ports.

The protocol processing block 211 contains buffers 2111 to 2113 for buffering frames to be processed by the channel interfaces 2101 to 2103, a protocol processing processor 2121 for executing protocol processing, and a processor-to-processor interface 2123 for communicating with the control block 212. The protocol processing block 211 controls the L2GW 103-1 or 103-y in accordance with connection-disconnection processing 21221, Service Name decision processing 21222, port processing 21223, timer processing 21224, a terminal management table 21225, a port management table 21226, a Service Name decision table 21227, and a VLAN ID management table 1012201, as instructed by the control block 212. The control terminal 213 is connected to the control network 1005 and controls communication between the L2GWs 1003-1 and 1003-y.

FIG. 12 shows the VLAN ID management table 1012201 of the L2GWs 1003-1 to 1003-y. The management table includes a usable VLAN ID 1201823 and a usage state thereof 1201824. The figure shows sample settings.

The other part of the configuration is the same as in the first embodiment.

Figures 1, 13:
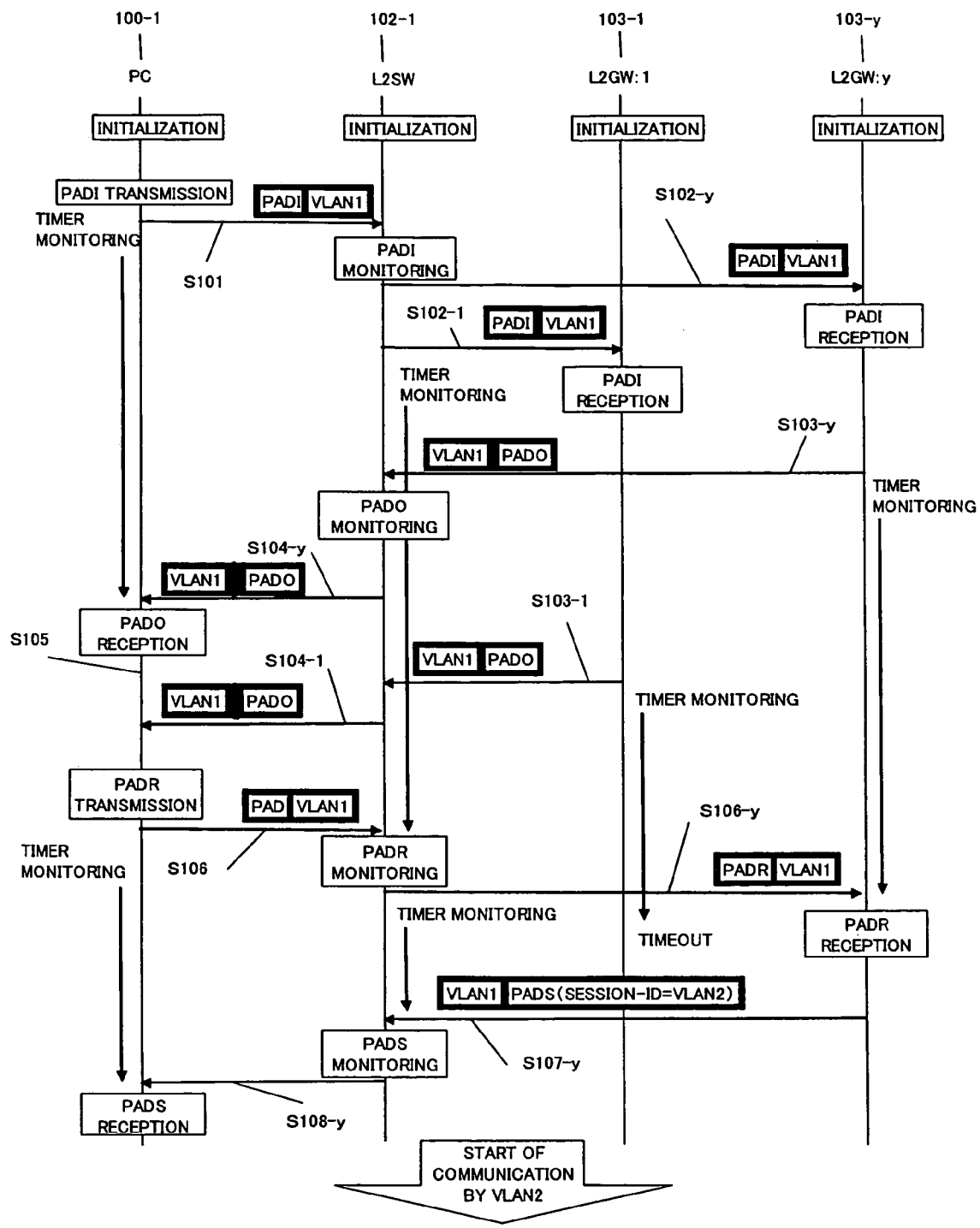
Figures 2, 13:
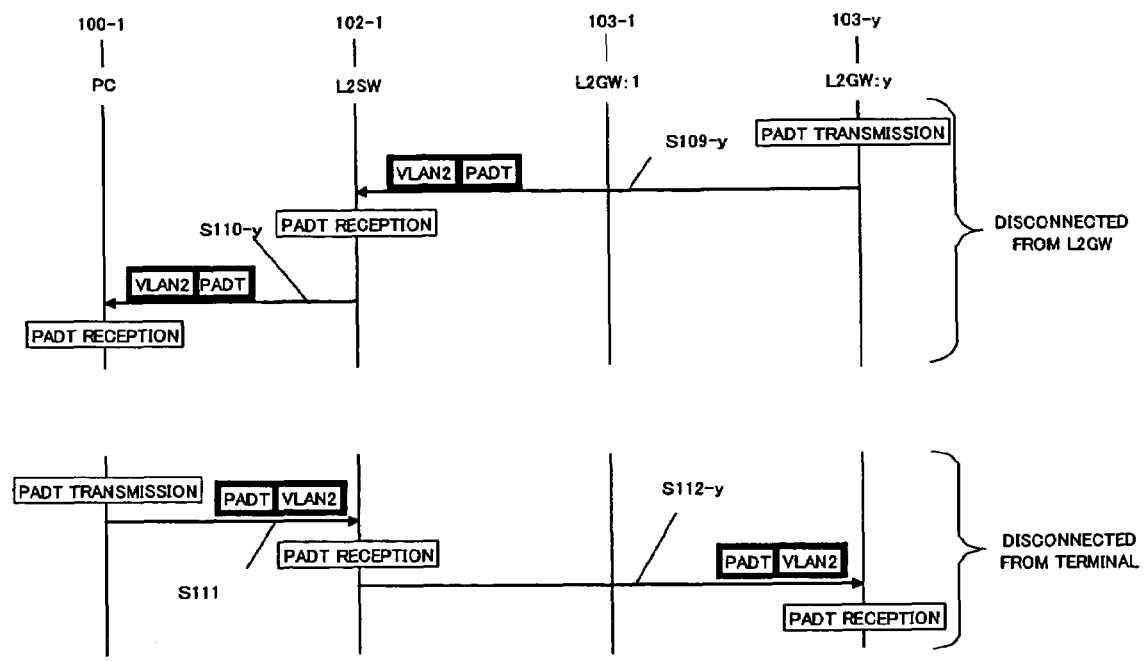

FIGS. 13-1 and 13-2 show a connection sequence and a disconnection sequence of the second embodiment. Only differences from the first embodiment will be described with reference to the sequence diagrams When the apparatuses are initialized at system startup, the VLAN ID management tables of the L2GWs 1003-1 and 1003-y are initialized as shown in FIG. 15-1.

In the connection sequence, frame reception sequences S101, S102-1, and S102-y from the terminal unit 101-1 to the L2GWs 1003-1 and 1003-y, frame reception sequences S103-y, S103-1, S104-y, and S104-1 from the L2GWs 1003-1 and 1003-y to the terminal 101-1, and frame reception sequences S106 and S106-y from the terminal 101-1 to the L2GWs 1003-1 and 1003-y are the same as in the first embodiment.

Figures 1, 14:
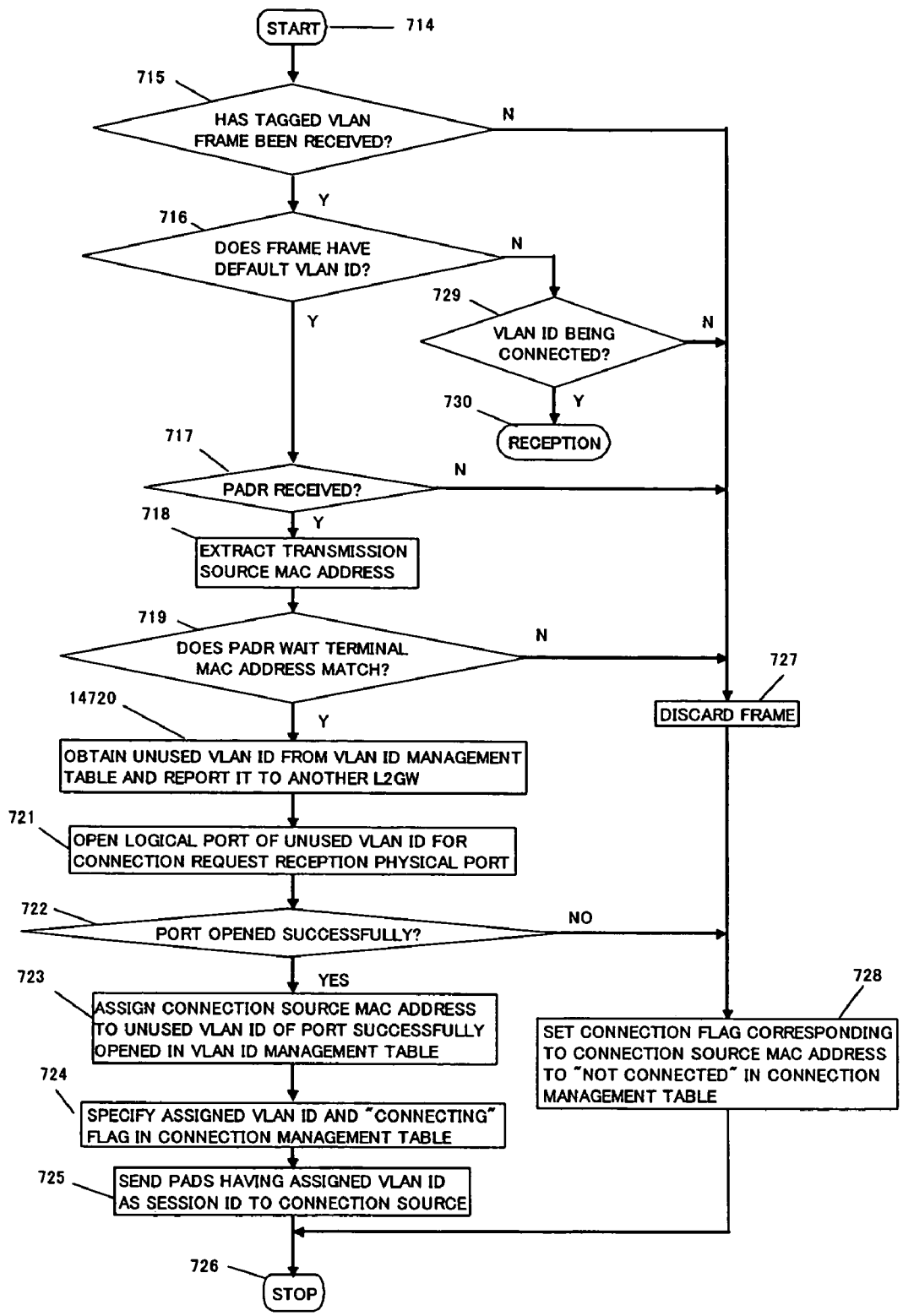
Figures 2, 14:
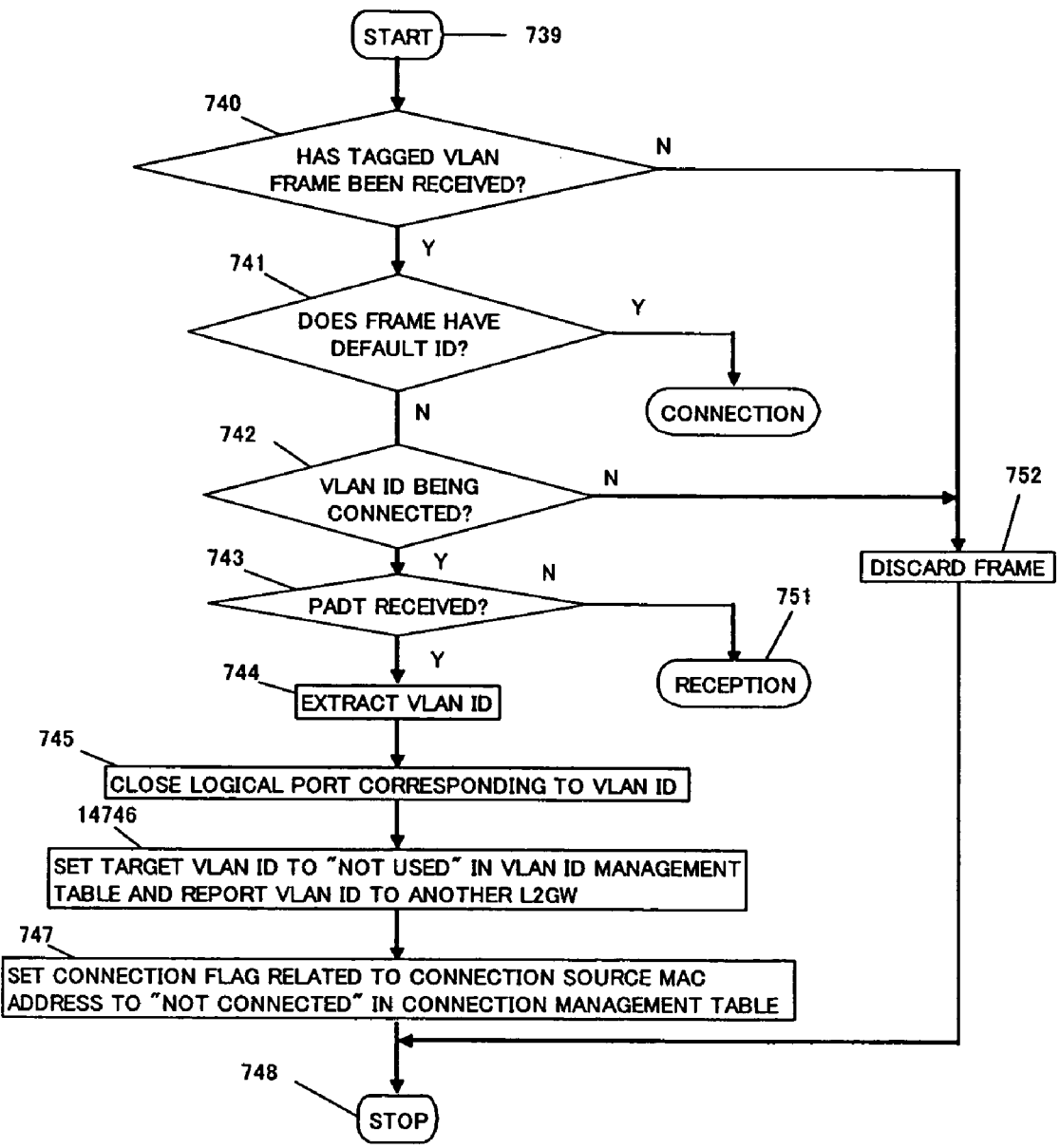
Figures 3, 14:
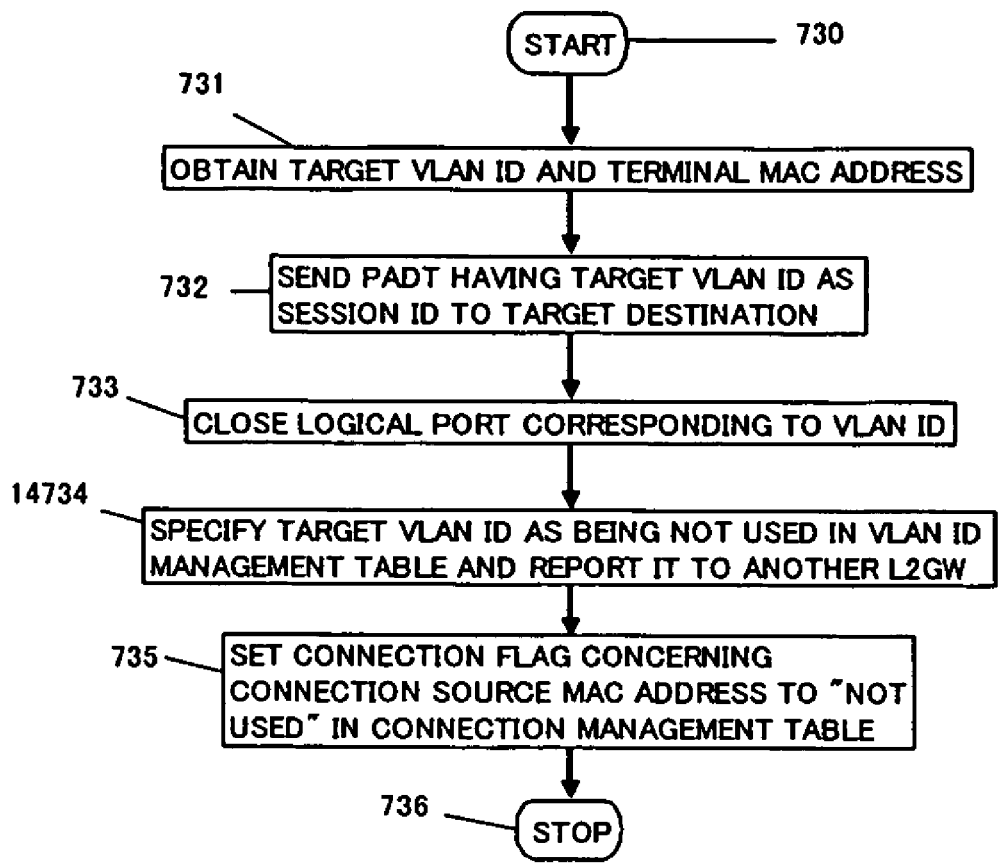

The L2GW 103-y receives a frame containing PADR and starts a PADR reception sequence 107-y. A flow chart of the processing is shown in FIG. 14-1. This sequence differs from that in the first embodiment in that the L2GW determines the VLAN ID to be assigned to the terminal in step 14720. The VLAN ID to be used is determined, and an "OCCUPIED" flag 15019232 is set in the VLAN ID management table, as shown in FIG. 15-2. The VLAN ID can be determined by any rule. The L2GW 1003-y reports the occupied VLAN ID to another L2GW 1003-1. The L2GW 1003-1 specifies in the internal VLAN ID management table that the reported VLAN ID is occupied 15019232, as shown in FIG. 15-2. The other part of the processing is the same as in the first embodiment. A PADS packet is sent to the terminal unit 101-1.

The disconnection sequence will be described next. When the L2GW 1003-y starts a disconnection sequence, a PADT transmission sequence S109-y starts. A flow chart of the processing is shown in FIG. 14-2. This sequence differs from that of the first embodiment in that the VLAN ID to be disconnected is deleted from the internal connection management table. The L2GW 1003-y specifies a "NOT USED" flag 15019232 for the VLAN ID to be disconnected in the connection management table, as shown in FIG. 15-3. The VLAN ID to be disconnected is reported to another L2GW 1003-1. The L2GW 1003-1 specifies that the reported VLAN ID is not used 15019232, in the internal VLAN ID management table, as shown in FIG. 15-3. The other part of the processing is the same as in the first embodiment, and a PADT packet is sent to the terminal unit 101-1. When the terminal unit 101-1 starts disconnection, the L2GW 1003-y receives a frame containing PADT and starts a PADT reception sequence. A flow chart of the processing is shown in FIG. 14-3. This sequence differs from that in the first embodiment in that the VLAN ID to be disconnected is deleted from the internal connection management table. The L2GW 1003-y sets a "NOT USED" flag 15019232 for the VLAN ID to be disconnected, in the connection management table, as shown in FIG. 15-3. The L2GW reports the VLAN ID to be disconnected to another L2GW 1003-1. The L2GW 1003-1 specifies in the internal VLAN ID management table that the reported VLAN ID is not used 15019232, as shown in FIG. 15-3.

C. Third Embodiment

The present invention can be applied when a PPPoE connection request is made by an untagged frame, without using the default VLAN, and when the network permits the transfer of the untagged VLAN frame, in the first or second embodiment. In that case, in the connection sequence, the PPPoE connection request is made by the untagged frame; the L2GW judges whether the connection can be made, in accordance with the terminal MAC address, Service Name, and other user information; not the session ID but the VLAN ID is sent to the user terminal; and the user terminal can communicate by a tagged VLAN frame having the assigned VLAN ID.

For instance, the following processing is executed in a VLAN network system having a plurality of L2SWs serving a plurality of user terminals, a plurality of L2GWs serving the L2SWs, and a host network to which the L2GWs are connected.

(1) The user terminal encapsulates a PADI packet in an untagged VLAN frame, broadcasts a connection request by the frame in accordance with the session establishment phase, and waits for a PADO packet.

(2) When the untagged VLAN frame containing the PADI packet is received from the user terminal, the L2SW registers the user terminal address, waits for a PADO packet from an L2GW, and transfers the received tagged VLAN frame to an L2GW to which transmission is allowed.

(3) When the untagged VLAN frame containing the PADI packet is received from the L2SW and when it is determined that the service name requested by the user terminal can be connected, the L2GW registers the transmission source user terminal address, waits for a PADR packet from the user terminal, and sends a tagged VLAN frame containing a PADO packet to the user terminal.

(4) When the untagged VLAN frame received from the L2GW contains a PADO packet, when the transmission destination address is the user terminal address, and when a PADO packet has been waited for, the L2SW registers the transmission source L2GW address in association with the user terminal address, waits for a PADR packet, and transfers the received tagged VLAN frame to the user terminal.

(5) When the untagged VLAN frame received from the L2SW contains a PADO packet, when the PADO packet has been waited for, and when the service name extracted from the packet has been registered, the user terminal registers the transmission source L2GW address, waits for a PADS packet, sends the tagged VLAN frame containing a PADR packet to the L2GW, and discards frames from another L2GW.

(6) When the untagged VLAN frame received from the user terminal contains a PADR packet and when the transmission source address and transmission destination address extracted from the PADR packet match the registered addresses of the user terminal and L2GW, the L2SW waits for a PADS packet and transfers the received tagged VLAN frame to the L2GW.

(7) When the untagged VLAN frame received from the L2SW contains a PADR packet and when the transmission source address extracted from the PADR packet matches the user terminal address in the PADR packet wait state, the L2GW obtains and registers the VLAN ID to be assigned to the user terminal, encapsulates a PADS packet having the assigned VLAN ID as a session ID in a tagged VLAN frame having the common VLAN ID, and sends the frame.

(8) When the untagged VLAN frame received from the L2GW contains a PADS packet and when the transmission source address and transmission destination address extracted from the packet match the L2GW address and the user terminal address, the L2SW extracts the assigned VLAN from the PADS packet, enables transmission and reception of the tagged VLAN frame having the assigned VLAN ID with respect to the user terminal and L2GW, and transfers the received tagged VLAN frame to the user terminal.

(9) When the untagged VLAN frame received from the L2SW contains a PADS packet and when the transmission source L2GW address is registered, the user terminal enables transmission and reception of a tagged VLAN frame having the assigned VLAN ID with respect to the L2GW and performs communication by using the assigned VLAN ID.

According to the present invention, when a user terminal makes a connection request to a network, a variety of negotiation means such as the 802.1x protocol can be used, besides the PPPoE protocol.

What is claimed is:

1. A virtual local area network (VLAN) system comprising:
a plurality of layer 2 switches (L2SWs) serving a plurality of user terminals;
a plurality of layer 2 gateways (L2GWs) serving the L2SWs; and
a host network to which the L2GWs are connected,
wherein a user terminal of the plurality of user terminals broadcasts a connection request by a tagged VLAN frame in which a common VLAN ID on the system is specified and a first packet is encapsulated, in accordance with a session establishment phase of a Point-to-Point Protocol over Ethernet (PPPoE) protocol, and waits for a second packet.
wherein an L2SW of the plurality of L2SWs receives a frame from the user terminal, and if the frame is a tagged VLAN frame in which the common VLAN ID is specified and the first packet is encapsulated, the L2SW registers the user terminal address, waits for a second packet from an L2GW of the plurality of L2GWs, and transfers the received tagged VLAN frame to the L2GW to which transmission is allowed,
wherein the L2GW receives the tagged VLAN frame from the L2SW, and if the frame is a tagged VLAN frame in which the common VLAN ID is specified and the first packet is encapsulated, and if it is determined that a service name requested by the user terminal can be connected, the L2GW registers a transmission source user terminal address, waits for a third packet from the user terminal, and sends a tagged VLAN frame containing the second packet to the user terminal,
wherein the L2SW receives a frame from the L2GW, and if the frame is a tagged VLAN frame in which the common VLAN ID is specified, a second packet is encapsulated, and a transmission destination address is the user terminal address and if a second packet has been waited for, the L2SW registers the transmission source L2GW address in association with the user terminal address, waits for a third packet, and transfers the received tagged VLAN frame to the user terminal,
wherein the user terminal receives a frame from the L2SW and if the frame is a tagged VLAN frame in which the common VLAN ID is specified and a second packet is encapsulated, if the second packet has been waited for, and if the service name extracted from the second packet has been registered, the user terminal registers the transmission source L2GW address, waits for a fourth packet, sends the tagged VLAN frame containing the third packet to the L2GW, and discards a frame from another L2GW,
wherein the L2SW receives a frame from the user terminal, and if the frame is a tagged VLAN frame in which the common VLAN ID is specified and a third packet is encapsulated and if the transmission source address and the transmission destination address extracted from the third packet match the registered user terminal address and L2GW address, the L2SW waits for a fourth packet and transfers the received tagged VLAN frame to the L2GW,
wherein the L2GW receives a frame from the L2SW, and if the frame is a tagged VLAN frame in which the common VLAN ID is specified and a third packet is encapsulated and if the transmission source address extracted from the third packet matches the address of the user terminal waiting for a third packet, the L2GW obtains and registers the VLAN ID to be assigned to the user terminal and reports the assigned VLAN ID by encapsulating a fourth packet having the assigned VLAN ID as a session ID in the tagged VLAN frame having the common VLAN ID, wherein the L2SW receives a frame from the L2GW, and if the frame is a tagged VLAN frame in which the common VLAN ID is specified and a fourth packet is encapsulated and if the transmission source address and the transmission destination address extracted from the second packet match the L2GW address and the user terminal address, the L2SW extracts the assigned VLAN ID from the fourth packet, enables transmission and reception of the tagged VLAN frame having the assigned VLAN ID with respect to the user terminal and the L2GW, and transfers the received tagged VLAN frame to the user terminal, and wherein the user terminal receives a frame from the L2SW, and if the frame is a tagged VLAN frame in which the common VLAN ID is specified and a fourth packet is encapsulated and if the transmission source L2GW address is registered, the user terminal enables transmission and reception of the tagged VLAN frame having the assigned VLAN ID with respect to the L2GW, and performs communication by using the assigned VLAN ID.

2. A virtual local area network (VLAN) system comprising:

a plurality of layer 2 switches (L2SWs) serving a plurality of user terminals;

a plurality of layer 2 gateways (L2GWs) serving the L2SWs; and a host network to which the L2GWs are connected, wherein the user terminal makes a connection request in accordance with a session establishment phase of a Point-to-Point Protocol over Ethernet (PPPoE) protocol and sends the connection request by an untagged VLAN frame in which a PPPOE packet is encapsulated, wherein the L2SW receives the VLAN frame and, if the reception of an untagged VLAN frame is enabled, transfers the VLAN frame to an L2GW of the plurality of L2SWs, wherein the L2GW receives the VLAN frame, and if the reception of an untagged VLAN frame is enabled, extracts a service requested by the user from the connection request made by the user terminal in the VLAN frame, judges whether the connection can be made in response to the connection request, and, if the connection is allowed, obtains a VLAN ID to be assigned to the user terminal, wherein the L2GW enables transmission and reception of a tagged VLAN frame having the assigned VLAN ID and reports the VLAN ID assigned to the user terminal by an untagged VLAN frame, wherein the L2SW receives the VLAN frame, extracts the VLAN ID assigned to the user terminal from the VLAN frame, enables transmission and reception of a tagged VLAN frame having the VLAN ID, and reports the VLAN frame to the user terminal, and wherein the user terminal receives the VLAN frame, enables transmission and reception of a tagged VLAN frame having the assigned VLAN ID, and performs communication by a tagged VLAN frame having the assigned VLAN ID.

3. The VLAN system according to claim 1, further comprising:

a VLAN ID management server for obtaining the VLAN ID to be assigned, wherein the L2GW obtains the VLAN ID to be assigned by making a request for a VLAN ID that can be assigned to the user terminal, to the VLAN ID management server connected to the host network, and wherein the VLAN ID management server receives the request, determines the VLAN ID that can be assigned in response to the VLAN ID request, manages the VLAN ID to be assigned in a management table, and reports the VLAN ID to be assigned to the requesting L2GW.

4. The VLAN system according to claim 1, wherein the L2GW comprises a VLAN ID management table for managing a VLAN ID to be assigned, and wherein the L2GW obtains the VLAN ID to be assigned by using a function to assign any or a predetermined VLAN ID to the user terminal and report the assigned VLAN ID to the user terminal and a function to report the information of the assigned VLAN ID to another L2GW.

5. The VLAN system according to claim 1, wherein the user terminal makes a disconnection request in accordance with the session establishment phase of the PPPoE protocol and sends a disconnection request for a VLAN ID for which the connection is to be disconnected, to the connection destination L2GW by a tagged VLAN frame having the VLAN ID, wherein the L2SW receives the VLAN frame, extracts the VLAN ID for which the connection is to be disconnected, from the VLAN frame, sends the VLAN frame to the L2GW to be disconnected, and disables transmission and reception of the tagged VLAN frame having the VLAN ID, and wherein the L2GW receives the VLAN frame, extracts the VLAN ID for which the connection is to be disconnected, from the VLAN frame, and disables transmission and reception of the tagged VLAN frame having the VLAN ID.

6. The VLAN system according to claim 5, wherein the L2GW further reports the VLAN ID for which the connection is to be disconnected to a VLAN ID management server connected to the host network; and wherein the VLAN ID management server disables the reported VLAN ID for which the connection is to be disconnected in a management table.

7. The VLAN system according to claim 1, wherein the L2GW makes a disconnection request in accordance with the session establishment phase of the PPPoE protocol, sends a disconnection request for a VLAN ID for which the connection is to be disconnected, to the connection destination user terminal by a tagged VLAN frame having the VLAN ID, and disables transmission and reception of a tagged VLAN frame having the VLAN ID, wherein the L2SW receives the VLAN frame, extracts the VLAN ID from the VLAN frame, sends the frame to the terminal to be disconnected, and disables transmission and reception of a tagged VLAN frame having the VLAN ID, and wherein the user terminal receives the frame, extracts the VLAN ID from the VLAN frame, and disables transmission and reception of a tagged VLAN frame having the VLAN ID.

8. The VLAN system according to claim 7, wherein the L2GW further reports the VLAN ID for which the connection is to be disconnected to a VLAN ID management server connected to the host network, and wherein the VLAN ID management server disables the reported VLAN ID in a management table.

9. A layer 2 switch (L2SW) in a virtual local area network (VLAN) system, the VLAN system comprising a plurality of L2SWs serving a plurality of user terminals, a plurality of layer 2 gateways (L2GWs) serving the L2SWs, and a host network to which the L2GWs are connected, the L2SW comprising:
- a first channel interface block for exchanging a VLAN frame with the user terminal;
- a second channel interface block for exchanging a VLAN frame with the host network;
- a switch block for transferring the VLAN frame between the first channel interface block and any second channel interface block; and
- a control block for controlling the first and second channel interface blocks and the switch block and performing transmission and reception of the VLAN frame,
- wherein the user terminal broadcasts a connection request by a tagged VLAN frame in which a common VLAN ID on the system is specified and a first packet is encapsulated, in accordance with a session establishment phase, and waits for a second packet,
- wherein the L2SW receives a frame from the user terminal, and if the frame is a tagged VLAN frame in which the common VLAN ID is specified and a first packet is encapsulated, the L2SW registers the user terminal address, waits for a second packet from an L2GW of the plurality of L2GWs, and transfers the received tagged VLAN frame to the L2GW to which transmission is allowed,
- wherein the L2GW receives a frame from the L2SW, and if the frame is a tagged VLAN frame in which the common VLAN ID is specified and a first packet is encapsulated and if it is determined that a service name requested by the user terminal can be connected, the L2GW registers a transmission source user terminal address, waits for a third packet from the user terminal, and sends a tagged VLAN frame containing a second packet to the user terminal,
- wherein the L2SW receives a frame from the L2GW, and if the frame is a tagged VLAN frame in which the common VLAN ID is specified, a second packet is encapsulated, and a transmission destination address is the user terminal address and if a second packet has been waited for, the L2SW registers the transmission source L2GW address in association with the user terminal address, waits for a third packet, and transfers the received tagged VLAN frame to the user terminal,
- wherein the user terminal receives a frame from the L2SW, and if the frame is a tagged VLAN frame in which the common VLAN ID is specified and a second packet is encapsulated, if a second packet has been waited for, and if the service name extracted from the second packet has been registered, the user terminal registers the transmission source L2GW address, waits for a fourth packet, sends the tagged VLAN frame containing the third packet to the L2GW, and discards a frame from another L2GW,
- wherein the L2SW receives a frame from the user terminal, and if the frame is a tagged VLAN frame in which the common VLAN ID is specified and a third packet is encapsulated and if the transmission source address and the transmission destination address extracted from the third packet match the registered user terminal address and L2GW address, the L2SW waits for a fourth packet and transfers the received tagged VLAN frame to the L2GW,
- wherein the L2GW receives a frame from the L2SW, and if the frame is a tagged VLAN frame in which the common VLAN ID is specified and a third packet is encapsulated and if the transmission source address extracted from the third packet matches the address of the user terminal waiting for a third packet, the L2GW obtains and registers the VLAN ID to be assigned to the user terminal and reporting the assigned VLAN ID by encapsulating a fourth packet having the assigned VLAN ID as a session ID in the tagged VLAN frame having the common VLAN ID,
- wherein the L2SW receives a frame from the L2GW, and if the frame is a tagged VLAN frame in which the common VLAN ID is specified and a fourth packet is encapsulated and if the transmission source address and the transmission destination address extracted from the second packet match the L2GW address and the user terminal address, the L2SW extracts the assigned VLAN ID from the fourth packet, enables transmission and reception of the tagged VLAN frame having the assigned VLAN ID with respect to the user terminal and the L2GW, and transfers the received tagged VLAN frame to the user terminal, and
- wherein the user terminal receives a frame from the L2SW, and if the frame is a tagged VLAN frame in which the common VLAN ID is specified and a fourth packet is encapsulated and if the transmission source L2GW address is registered, the user terminal enables transmission and reception of the tagged VLAN frame having the assigned VLAN ID with respect to the L2GW, and performs communication by using the assigned VLAN ID.

10. The L2SW according to claim 9, further comprising:
- a function to monitor a tagged VLAN frame received from the user terminal or the L2GW, the VLAN frame containing a connection request and having the common VLAN ID on the system; and
- a connection management table for extracting the VLAN ID assigned to the user terminal, a user terminal MAC address, a transmission destination L2GW MAC address, and a PPPoE protocol type from the VLAN frame and recording information of the VLAN frame as a connection request status,
- wherein a communication path between the user terminal and the L2GW is established by specifying the VLAN ID assigned to the user terminal, with respect to ports connected to the user terminal and the connection destination L2GW.

11. A layer 2 gateway (L2GW) in a VLAN network system comprising a plurality of layer 2 switches (L2SWs) serving a plurality of user terminals, a plurality of L2GWs serving the L2SWs, and a host network to which the L2GWs are connected, the L2GW comprising:
- a first channel interface block for exchanging a VLAN frame with the L2SW; and
- a processing block for analyzing the VLAN frame and performing transmission and reception of the VLAN frame,
- wherein the user terminal broadcasts a connection request by a tagged VLAN frame in which a common VLAN ID on the system is specified and a first packet is encapsulated, in accordance with a session establishment phase, and waits for a second packet,
- wherein the L2SW receives a frame from the user terminal, and if the frame is a tagged VLAN frame in which the common VLAN ID is specified and a first packet is encapsulated, the L2SW registers the user terminal address, waiting for a second packet from L2GW, and transfers the received tagged VLAN frame to L2GW to which transmission is allowed,
- wherein the L2GW receives a frame from the L2SW, and if the frame is a tagged VLAN frame in which the common VLAN ID is specified and a first packet is encapsulated and if it is determined that a service name requested by the user terminal can be connected, the L2GW registers a transmission source user terminal address, waits for a third packet from the user terminal, and sends a tagged VLAN frame containing a second packet to the user terminal, wherein the L2SW receives a frame from the L2GW, and if the frame is a tagged VLAN frame in which the common VLAN ID is specified, a second packet is encapsulated, and a transmission destination address is the user terminal address and if a second packet has been waited for, the L2SW registers the transmission source L2GW address in association with the user terminal address, waits for a third packet, and transfers the received tagged VLAN frame to the user terminal, wherein the user terminal receives a frame from the L2SW, and if the frame is a tagged VLAN frame in which the common VLAN ID is specified and a second packet is encapsulated, if a second packet has been waited for, and if the service name extracted from the second packet has been registered, the user terminal registers the transmission source L2GW address, waits for a fourth packet, sends the tagged VLAN frame containing the third packet to the L2GW, and discards frame from another L2GW, wherein the L2SW receives a frame from the user terminal, and if the frame is a tagged VLAN frame in which the common VLAN ID is specified and a third packet is encapsulated and if the transmission source address and the transmission destination address extracted from the third packet match the registered user terminal address and L2GW address, the L2SW waits for a fourth packet and transfers the received tagged VLAN frame to the L2GW, wherein the L2GW receives a frame from the L2SW, and if the frame is a tagged VLAN frame in which the common VLAN ID is specified and a third packet is encapsulated and if the transmission source address extracted from the third packet matches the address of the user terminal waiting for a third packet, the L2GW obtains and registers the VLAN ID to be assigned to the user terminal and reporting the assigned VLAN ID by encapsulating a fourth packet having the assigned VLAN ID as a session ID in the tagged VLAN frame having the common VLAN ID, wherein the L2SW receives a frame from the L2GW, and if the frame is a tagged VLAN frame in which the common VLAN ID is specified and a fourth packet is encapsulated and if the transmission source address and the transmission destination address extracted from the second packet match the L2GW address and the user terminal address, the L2SW extracts the assigned VLAN ID from the fourth packet, enables transmission and reception of the tagged VLAN frame having the assigned VLAN ID with respect to the user terminal and the L2GW, and transfers the received tagged VLAN frame to the user terminal, and wherein the user terminal receives a frame from the L2SW, and if the frame is a tagged VLAN frame in which the common VLAN ID is specified and a fourth packet is encapsulated and if the transmission source L2GW address is registered, the user terminal enables transmission and reception of the tagged VLAN frame having the assigned VLAN ID with respect to the L2GW, and performs communication by using the assigned VLAN ID.

12. The L2GW according to claim 11, further comprising:
a function to monitor a tagged VLAN frame containing a connection request from the user terminal and having the common VLAN ID on the system;
a connection management table for extracting a user terminal MAC address, a service requested by the user terminal, a transmission destination L2GW MAC address, and a PPPoE packet type from the VLAN frame and recording them as a connection request status;
a Service Name decision table which lists services that can be provided by the L2GW; and
a function to determine whether the service requested by the user can be provided,
wherein a connection path between the user terminal and the host network being established by specifying the VLAN ID assigned to the user terminal to a port connected to the L2SW to which the user terminal is connected.

13. The VLAN system according to claim 1, wherein a negotiation means, including the PPPoE protocol is used for a connection request from the user terminal to the network.

14. The VLAN system according to claim 2, further comprising:
a VLAN ID management server for obtaining the VLAN ID to be assigned,
wherein the L2GW obtains the VLAN ID to be assigned by making a request for a VLAN ID that can be assigned to the user terminal, to the VLAN ID management server connected to the host network, and
wherein the VLAN ID management server receives the request, determines the VLAN ID that can be assigned in response to the VLAN ID request, manages the VLAN ID to be assigned in a management table, and reports the VLAN ID to be assigned to the requesting L2GW.

15. The VLAN system according to claim 2,
wherein the L2GW comprises a VLAN ID management table for managing a VLAN ID to be assigned, and
wherein the L2GW obtains the VLAN ID to be assigned by using a function to assign any or a predetermined VLAN ID to the user terminal and report the assigned VLAN ID to the user terminal and a function to report the information of the assigned VLAN ID to another L2GW.

16. The VLAN system according to claim 2,
wherein the user terminal makes a disconnection request in accordance with the session establishment phase of the PPPoE protocol and sends a disconnection request for a VLAN ID for which the connection is to be disconnected, to the connection destination L2GW by a tagged VLAN frame having the VLAN ID,
wherein the L2SW receives the VLAN frame, extracts the VLAN ID for which the connection is to be disconnected, from the VLAN frame, sends the VLAN frame to the L2GW to be disconnected, and disables transmission and reception of the tagged VLAN frame having the VLAN ID, and
wherein the L2GW receives the VLAN frame, extracts the VLAN ID for which the connection is to be disconnected, from the VLAN frame, and disables transmission and reception of the tagged VLAN frame having the VLAN ID.

17. The VLAN system according to claim 16,
wherein the L2GW further reports the VLAN ID for which the connection is to be disconnected to a VLAN ID management server connected to the host network, and
wherein the VLAN ID management server disables the reported VLAN ID for which the connection is to be disconnected in a management table.

18. The VLAN system according to claim 2, wherein the L2GW makes a disconnection request in accordance with the session establishment phase of the PPPoE protocol, sends a disconnection request for a VLAN ID for which the connection is to be disconnected, to the connection destination user terminal by a tagged VLAN frame having the VLAN ID, and disables transmission and reception of a tagged VLAN frame having the VLAN ID, wherein the L2SW receives the VLAN frame, extracts the VLAN ID from the VLAN frame, sends the frame to the terminal to be disconnected, and disables transmission and reception of a tagged VLAN frame having the VLAN ID, and wherein the user terminal receives the frame, extracts the VLAN ID from the VLAN frame, and disables transmission and reception of a tagged VLAN frame having the VLAN ID.

19. The VLAN system according to claim 18, wherein the L2GW further reports the VLAN ID for which the connection is to be disconnected to a VLAN ID management server connected to the host network, and wherein the VLAN ID management server disables the reported VLAN ID in a management table.

20. The VLAN system according to claim 2, wherein a negotiation means, including the PPPoE protocol, is used for a connection request from the user terminal to the network.

* * * * *